(12) United States Patent
Yamazaki

(10) Patent No.: US 11,720,397 B2
(45) Date of Patent: Aug. 8, 2023

(54) INFORMATION PROCESSING METHOD AND APPARATUS TO MIGRATE TASKS BETWEEN RESOURCES

(71) Applicant: FUJITSU LIMITED, Kawasaki (JP)

(72) Inventor: Masanori Yamazaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 343 days.

(21) Appl. No.: 16/901,399

(22) Filed: Jun. 15, 2020

(65) Prior Publication Data
US 2021/0011758 A1    Jan. 14, 2021

(30) Foreign Application Priority Data
Jul. 8, 2019    (JP) ................................ 2019-126692

(51) Int. Cl.
*G06F 9/46*    (2006.01)
*G06F 9/48*    (2006.01)
(Continued)

(52) U.S. Cl.
CPC .......... *G06F 9/4856* (2013.01); *G06F 9/4881* (2013.01); *G06F 9/505* (2013.01);
(Continued)

(58) Field of Classification Search
CPC ...... G06F 9/4856; G06F 9/4881; G06F 9/505; G06F 2209/5022; H04L 43/0852; H04L 43/0888
(Continued)

(56) References Cited

U.S. PATENT DOCUMENTS 6,438,652 B1 *    8/2002    Jordan .................... G06F 9/505
                                                                 709/219
8,087,025 B1 *    12/2011    Graupner ............... G06F 9/505
                                                                 718/104
(Continued)

FOREIGN PATENT DOCUMENTS

JP    2007-226587    9/2007
JP    2009-237935    10/2009
JP    2013-250905    12/2013

OTHER PUBLICATIONS

European Office Action dated Feb. 1, 2022 from European Application No. 20181378.9.
(Continued)

*Primary Examiner* — Bradley A Teets
(74) *Attorney, Agent, or Firm* — Staas & Halsey LLP

(57) ABSTRACT

A non-transitory computer-readable recording medium has stored therein a program that causes a first apparatus to execute a process, the process including: when a load of a first resource existing in a first group is equal to or more than a first threshold value, searching the first group for a first destination resource that is a migration destination of a first task performed using the first resource, the first apparatus being included in the first group; when the first destination resource is not found in the first group, selecting a second group based on first information; transmitting a first request to search for the first destination resource to a second apparatus included in the second group; and when a second resource that is the first destination resource is found in the second group, updating the first information based on second information that is transmitted from the second apparatus.

18 Claims, 16 Drawing Sheets

(51) Int. Cl.
*G06F 9/50* (2006.01)
*H04L 43/0852* (2022.01)
*H04L 43/0888* (2022.01)

(52) U.S. Cl.
CPC ...... *H04L 43/0852* (2013.01); *H04L 43/0888* (2013.01); *G06F 2209/5022* (2013.01)

(58) Field of Classification Search
USPC .................................................. 718/10, 100
See application file for complete search history.

(56) References Cited

U.S. PATENT DOCUMENTS

| | | | |
|---|---|---|---|
| 9,465,658 B1* | 10/2016 | Shashi | G06F 9/5027 |
| 11,086,683 B2* | 8/2021 | Gavali | G06F 9/5072 |
| 2009/0245113 A1 | 10/2009 | Kamiya | |
| 2014/0173623 A1 | 6/2014 | Chang et al. | |
| 2015/0281345 A1* | 10/2015 | Kobayashi | G06F 9/5088 |
| | | | 709/226 |
| 2017/0199770 A1* | 7/2017 | Peteva | G06F 9/5088 |
| 2018/0157527 A1 | 6/2018 | Tung et al. | |
| 2019/0317812 A1* | 10/2019 | Gebara | G06N 3/084 |

OTHER PUBLICATIONS

European Search Report dated Nov. 18, 2020 in corresponding European Patent Application No. 20181378.9.
European Office Action dated Apr. 11, 2023 for European Application No. 20181378.9.

* cited by examiner

| RESOURCE SIZE | RESOURCE ID | AVERAGE USAGE RATE | UPDATE TIMING |
|---|---|---|---|
| 3vCPU | VM1 | 25% | 16:56:00 |
| 3vCPU | VM2 | 30% | 16:57:10 |
| 4vCPU | VMx | 12% | ... |

| RESOURCE SIZE | REGION ID | RESOURCE ID | UPDATE TIMING |
|---|---|---|---|
| 3vCPU | Reg1 | VM1 | 16:56:00 |
| 3vCPU | Reg3 | VM2 | 16:57:10 |
| 4vCPU | Reg3 | VMn | 16:57:30 |
| 3vCPU | Regn | VMm | 16:58:00 |
| 4vCPU | Reg4 | VMx | 16:58:15 |
| 4vCPU | Reg3 | VMy | 16:58:50 |
| ⋮ | ⋮ | ⋮ | ⋮ |

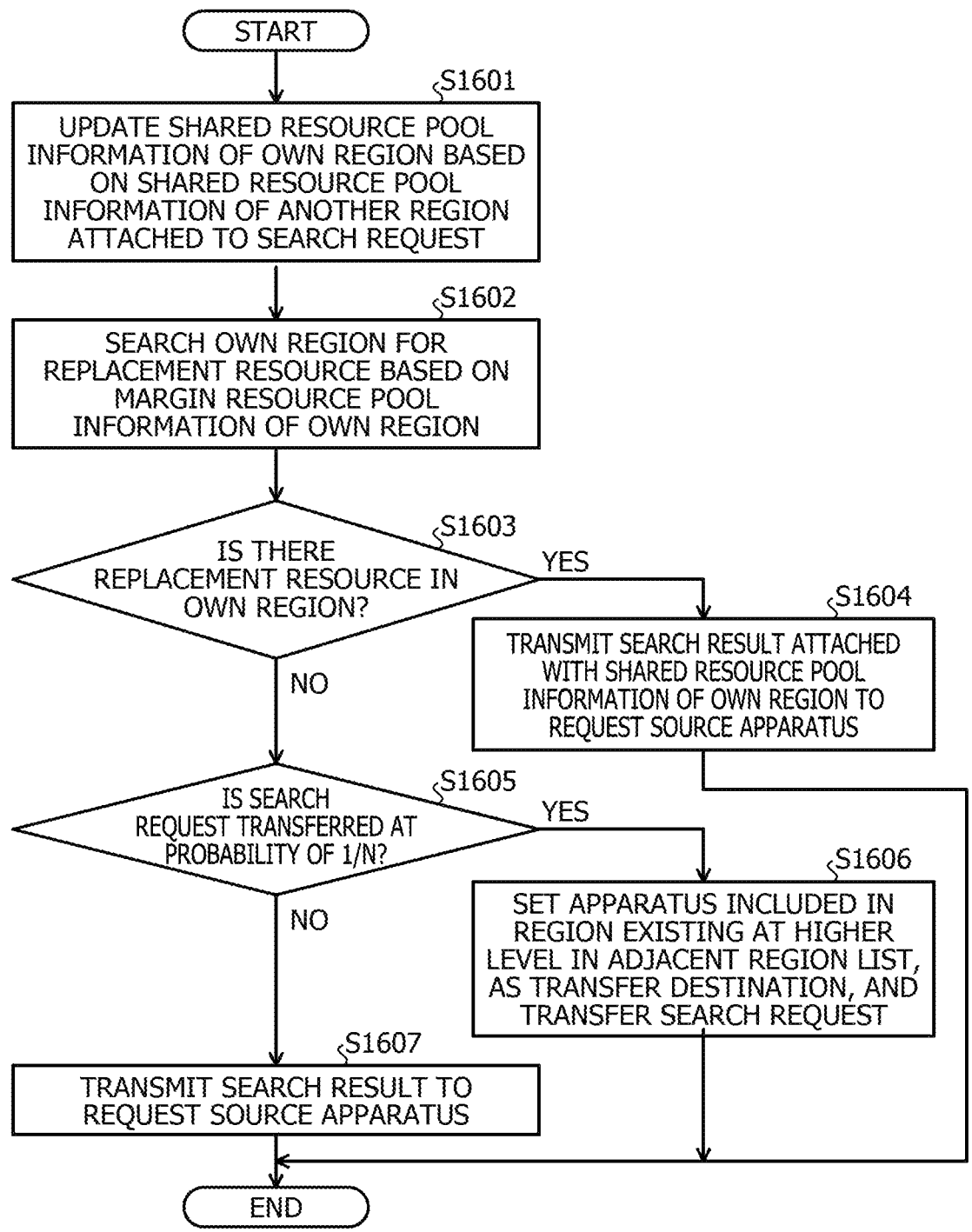

INFORMATION PROCESSING METHOD AND APPARATUS TO MIGRATE TASKS BETWEEN RESOURCES

CROSS-REFERENCE TO RELATED APPLICATION

This application is based upon and claims the benefit of the prior Japanese Patent Application No. 2019-126692, filed on Jul. 8, 2019, the entire contents of which are incorporated herein by reference.

FIELD

The embodiments discussed herein are related to an information processing program, an information processing method, and an information processing apparatus.

BACKGROUND

In the related art, there is a system in which each of a plurality of apparatuses manages resources existing in a region to which the apparatus belongs. In this system, a service may be implemented by using resources existing in a plurality of regions. For example, a service may be implemented by using resources existing in a plurality of public cloud environments provided by different vendors.

As the related art, for example, there is a technique which detects an occurrence of a deadline miss exceeding a processing limit of a process, and recommends to re-assign the processing of the process to a computer different from the current computer. In addition, for example, there is a technique which transfers a processing to a server with a relatively low load by dynamically changing a register destination server of a registered user terminal according to the load of the server. Further, for example, there is a technique which adds a distribution to a first service rate of a virtual computer when the average usage rate of the virtual computer is equal to or higher than a predetermined usage rate threshold value and the average shortage rate of the virtual computer is equal to or higher than a predetermined shortage rate threshold value, and notifies a virtual computer monitor of the first service rate to which the distribution is added.

Related techniques are disclosed in, for example, Japanese Laid-Open Patent Publication No. 2007-226587, Japanese Laid-Open Patent Publication No. 2009-237935, and Japanese Laid-Open Patent Publication No. 2013-250905.

SUMMARY

According to an aspect of the embodiments, a non-transitory computer-readable recording medium has stored therein a program that causes a first apparatus to execute a process, the process including: when a load of a first resource existing in a first group is equal to or more than a first threshold value, searching the first group for a first destination resource that is a migration destination of a first task performed using the first resource, the first group being included in a system that includes a plurality of groups communicably coupled to each other, each of the plurality of groups including a plurality of resources and an apparatus for managing the plurality of resources, the first apparatus being included in the first group; when the first destination resource is not found in the first group, selecting a second group based on first information that identifies a group including a resource having a load measured to be less than a second threshold value, by referring to a degree of separation from the first group; transmitting a first request to search for the first destination resource to a second apparatus included in the second group; and when a second resource that is the first destination resource is found in the second group, updating the first information based on second information that is transmitted from the second apparatus and identifies a group including a resource having a load measured to be less than the second threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is an explanatory view illustrating an example of contents stored in shared resource pool information 700.

FIG. 16 is a flowchart illustrating an example of a response processing procedure.

DESCRIPTION OF EMBODIMENTS

Here, in a system in which each of a plurality of apparatuses manages resources existing in a region to which the apparatus belongs, the load of a resource managed by any one apparatus may increase to a threshold value or more. In this case, it may be considered that any one apparatus refers to information on the load of each resource in the system, and migrates a task being performed using the resource whose load is increasing to the threshold value or more to another resource. However, in the related art, when each apparatus periodically collects information on the load of each resource managed by another apparatus, the traffic amount required to the collection of information becomes enormous.

Hereinafter, embodiments of an information processing program, an information processing method, and an information processing apparatus according to the present disclosure will be described in detail with reference to the drawings.

(Example of Information Processing Method According to Embodiment)

Figure 1:
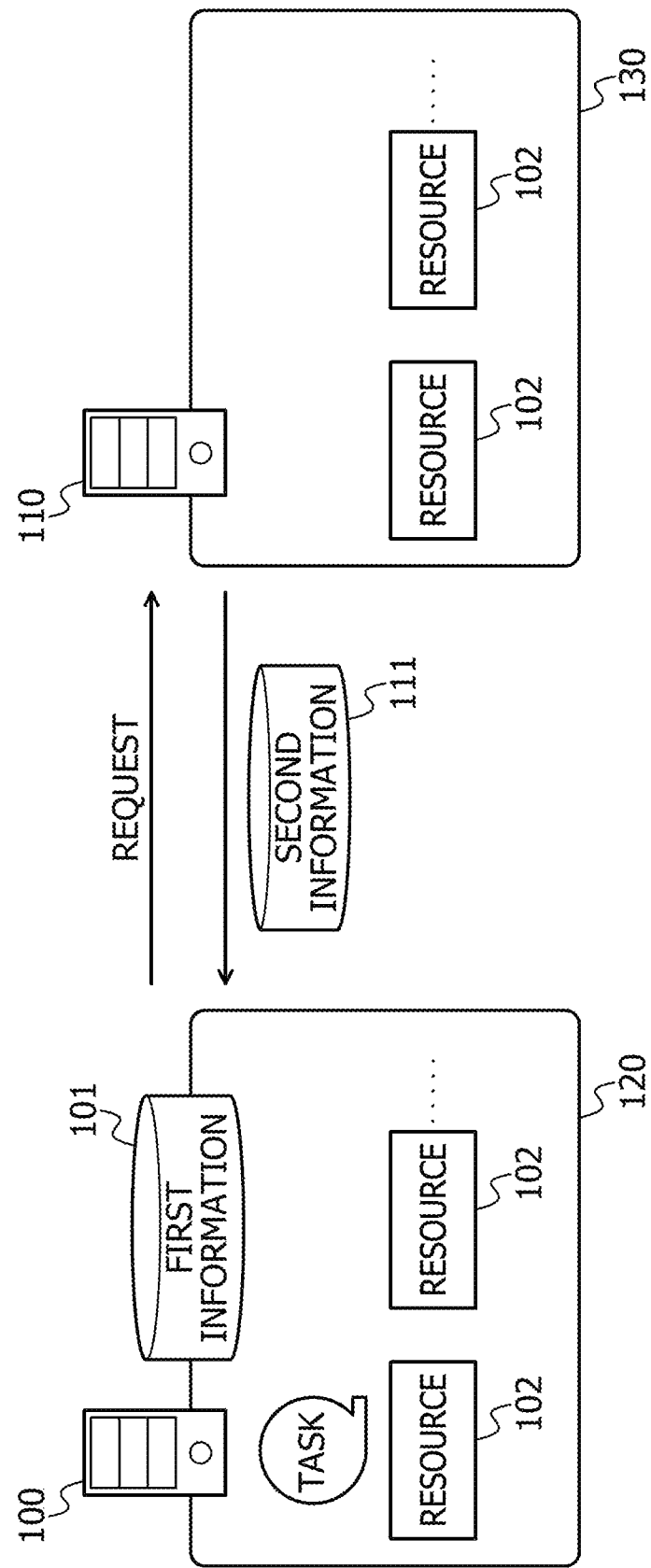
FIG. 1 is an explanatory view illustrating an example of an information processing method according to an embodiment.

FIG. 1 is an explanatory view illustrating an example of an information processing method according to an embodiment. In FIG. 1, an information processing apparatus 100 is a computer that may serve as a first apparatus which is included in a first group among a plurality of groups in a system where the plurality of groups are communicably coupled to each other, and manages resources included in the first group. An apparatus included in each of the plurality of groups manages resources included in the corresponding group.

Each of the plurality of groups corresponds to a resource cluster including a plurality of resources and an apparatus that manages the resources. The plurality of resources included in the resource cluster may exist in, for example, the same location. Some of the resources included in the resource cluster may exist in, for example, different locations. The location where the resource cluster corresponding to any one group of the plurality of groups exists may partially overlap with the location where the resource cluster corresponding to another group exists. The location where the resource cluster exists is also called, for example, a zone or a region.

A resource is used for implementing a service. The resource performs, for example, a task for forming the service. The service includes, for example, a plurality of tasks, and is implemented when a plurality of resources executes the plurality of tasks, respectively. The resource is, for example, an arithmetic device, a storage device, a communication band, or the like. The task is, for example, an application. In the following description, the application may be referred to as an "app."

The system described above is implemented by, for example, a multi-cloud environment in which a plurality of public cloud environments provided by different vendors is combined with each other. The public cloud environment includes resources, and does not limit a user who uses the resources and allows a third party to use the resources. Further, the system may include a private cloud environment as well. The private cloud environment includes resources, and limits a user who uses the resources and allows a user who builds the private cloud environment to use the resources. The private cloud environment is, for example, an on-premises environment.

Here, in the system described above, the load of a resource existing in a group including any one apparatus and used for any one task of a plurality of tasks included in a service may increase to a threshold value or more, which may cause a degradation in service performance. In the related art, any one apparatus may cause any one task that is performed using the resource whose load increases to the threshold value or more among the plurality of tasks included in the service, to be distributed and performed in two resources by a load balancer, thereby reducing the load of resources. However, there is a problem in that the number of resources used for implementing the service increases, causing an increase in costs for implementing the service.

Meanwhile, a method may be conceived in which any one apparatus refers to information on the load of each resource in the system, and migrates any one task of the plurality of tasks included in the service that is performed using the resource whose load increases to a threshold value or more, to another resource. This method has a problem in that since each apparatus periodically communicates with another apparatus to collect information on the load of each resource existing in a group including the corresponding apparatus, the traffic amount required for the information collection becomes enormous.

In particular, when the system described above is implemented by the multi-cloud environment, each apparatus cannot use a dedicated line, the Intranet or the like when communicating with another apparatus, but uses the Internet, causing the enormous traffic amount on the Internet.

Therefore, in the present embodiment, descriptions will be made on an information processing method in which any one apparatus exchanges information with another apparatus on an occasion where the own apparatus causes the another apparatus to search for a resource that becomes a migration destination of a task performed using a resource existing in a group including the own apparatus. According to the method, the traffic amount may be reduced.

In the example of FIG. 1, an information processing apparatus 100 stores a first threshold value and a second threshold value. The first threshold value is represented by, for example, a ratio to the size of a resource 102. The first threshold value is, for example, a threshold value for determining whether or not a task performed using a resource 102 may be migrated to another resource 102. The second threshold value is represented by, for example, a ratio to the size of a resource 102. The second threshold value is, for example, a threshold value for determining whether or not the resource 102 may be migrated. The first threshold value may be, for example, the same value as the second threshold value.

The information processing apparatus 100 stores first information 101. The first information 101 is information that identifies one or more groups including a resource 102 whose load is measured to be less than the second threshold value, among a plurality of groups in the system. The load is, for example, a usage rate of an arithmetic device, a usage rate of a storage device, an amount of data input to or output from a communication band, or the like.

(1-1) The information processing apparatus 100 measures the load of each resource 102 existing in a first group 120.

(1-2) The information processing apparatus 100 determines whether or not the load of a first resource 102 existing in the first group 120 is equal to or more than the first threshold value, based on the measurement result. When the load of the first resource 102 is equal to or more than the first threshold value, the information processing apparatus 100 searches for a resource 102 which is a migration destination of a first task performed using the first resource 102 among a plurality of tasks for forming a service, from the first group 120.

(1-3) As a result of the search, when no migration destination resource 102 is found in the first group 120, the information processing apparatus 100 identifies one or more groups that include a resource 102 whose load has been measured to be less than the second threshold value, based on the first information 101. The information processing apparatus 100 refers to the degree of separation between each of the identified one or more groups and the first group 120, and selects a second group 130 from the identified one or more groups. The second group 130 becomes a target for searching for a migration destination resource 102. The degree of separation between groups is, for example, a physical distance or a communication distance between groups. The degree of separation between groups is, specifically, a physical distance or a communication distance between apparatuses that manage resources included in different groups.

Here, there is a tendency that as the selected group is farther from the first group 120, the performance of the service formed by the first task is degraded due to a network latency when the first task is migrated to a resource 102 existing in the selected group. Thus, a group may be set relatively close to the first group 120 as a target for searching for a migration destination resource 102. Therefore, the information processing apparatus 100 selects, for example, the second group 130 that is relatively close to the first group 120, from the identified one or more groups.

(1-4) The information processing apparatus 100 transmits a request to search for the resource 102 as a migration destination resource 102 to a second apparatuses 110 included in the selected second group 130. Accordingly, the second apparatus 110 receives the request, and searches the second group 130 for a migration destination resource 102.

Here, the second apparatus 110 stores second information 111. The second information 111 is information that identifies one or more groups including a resource 102 whose load has been measured to be less than the second threshold value among the plurality of groups. The second apparatus 110 transmits the second information 111 to the information processing apparatus 100 when a second resource 102 which is a migration destination is found in the second group 130.

(1-5) As a result of transmitting the request, when the second resource 102 which is the migration destination is found in the second group 130, the information processing apparatus 100 updates the first information 101 based on the second information 111 transmitted from the second apparatus 110.

Thereby, the information processing apparatus 100 may reduce the traffic amount required for the information collection for updating the first information 101. For example, the information processing apparatus 100 may perform the information collection for updating the first information 101 in accordance with an opportunity to communicate with the second apparatus 110 in order to transmit the request to the second apparatus 110. Thus, the information processing apparatus 100 may reduce the traffic amount, as compared with a case where information collection for periodically updating the first information 101 is performed.

Further, for example, the information processing apparatus 100 may select a group including a resource 102 which is unlikely to cause a degradation in service performance due to the network latency even when the first task is migrated since the group is relatively close to the first group 120, as the second group 130. Then, the information processing apparatus 100 may collect the information for updating the first information 101, from the second apparatus 110 included in the selected second group 130. Then, the information processing apparatus 100 may effectively update the first information 101 with the information determined to be useful from the viewpoint of searching for a migration destination resource 102. Further, when the information processing apparatus 100 communicates with the second apparatus 110 included in the second group 130 relatively close to the first group 120, the information processing apparatus 100 does not need to communicate with all of the identified one or more apparatuses, so that the traffic amount may be reduced.

Further, based on the first information 101, the information processing apparatus 100 may collect the information for updating the first information 101, from the second apparatus 110 included in the second group 130 that includes the resource 102 whose load is measured to be less than the second threshold value in the past. Thus, the information processing apparatus 100 prevents the request from being transmitted to an apparatus included in a group having a relatively low probability of including a migration destination resource 102, thereby searching for a migration destination resource 102 while reducing the traffic amount.

(Example of Information Processing System 200)

Next, an example of an information processing system 200 to which the information processing apparatus 100 illustrated in FIG. 1 is applied will be described with reference to FIG. 2.

Figure 2:
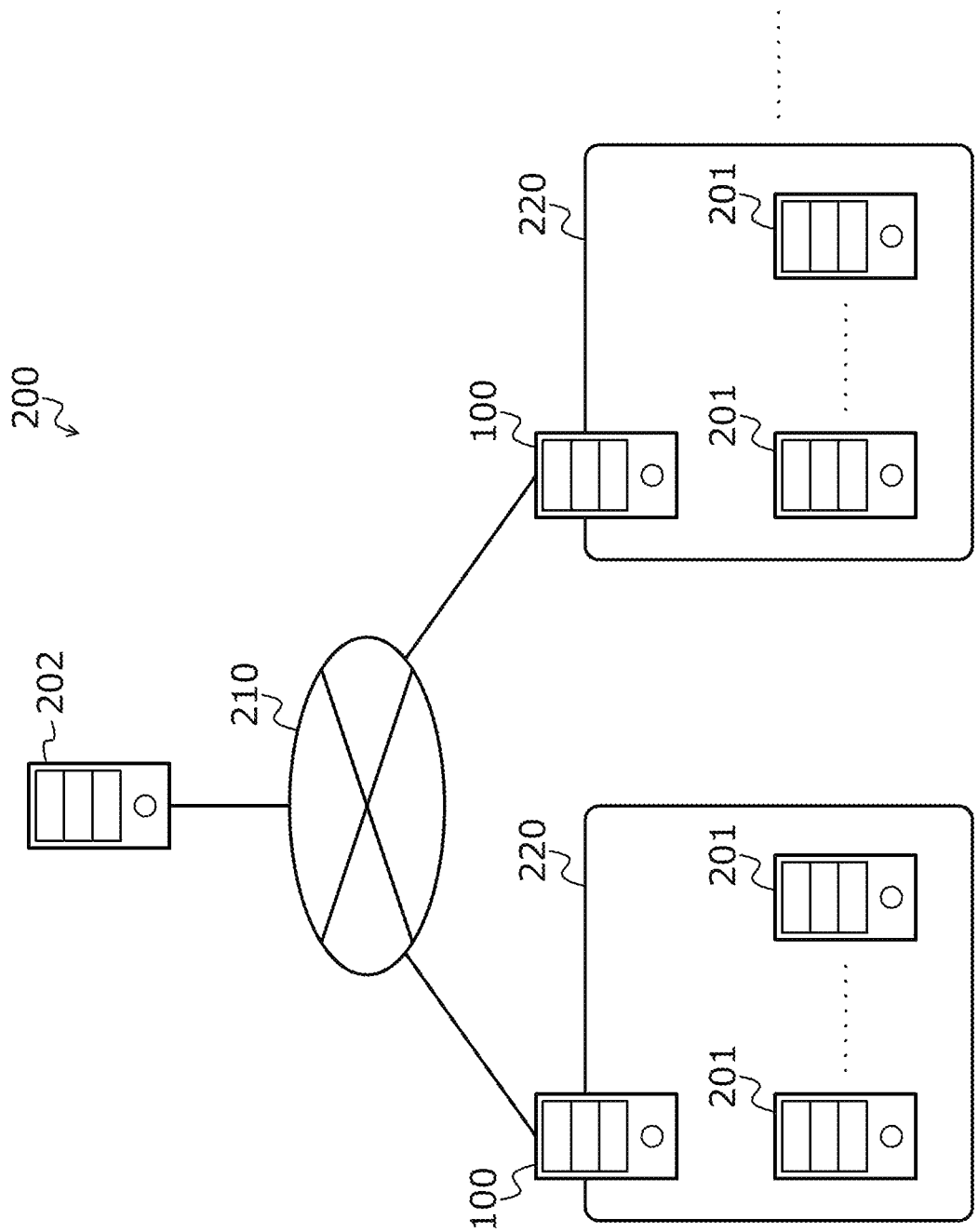
FIG. 2 is an explanatory view illustrating an example of an information processing system 200.

FIG. 2 is an explanatory view illustrating an example of the information processing system 200. In FIG. 2, the information processing system 200 includes a plurality of information processing apparatuses 100, a plurality of resource apparatuses 201, and a management apparatus 202.

In the information processing system 200, the information processing apparatuses 100 and the management apparatus 202 are coupled to each other via a wired or wireless network 210. The network 210 is, for example, a LAN (Local Area Network), a WAN (Wide Area Network), the Internet or the like.

The information processing apparatus 100 measures the load of resources. The information processing apparatus 100 stores the result of measuring the load of resources using margin resource pool information 600 to be described later with reference to FIG. 6. When the load of a first resource in a region 220 where the own apparatus exists is equal to or more than the first threshold value, the information processing apparatus 100 searches the region 200 where the own apparatus exists, for a resource which is a migration destination of a first task performed using the first resource. In the following description, the region 220 where the own apparatus exists may be referred to as the "own region 220."

When a migration destination resource is not found, the information processing apparatus 100 transmits a search request 400 to be described later with reference to FIG. 4 to another information processing apparatus 100, based on an adjacent region list 500 to be described later with reference to FIG. 5 and shared resource pool information 700 to be described later with reference to FIG. 8. Accordingly, the information processing apparatus 100 may cause another information processing apparatus 100 to search the region 220 where the corresponding apparatus 100 exists, for a migration destination resource. In the following description, the region 220 where another information processing apparatus 100 exists may be referred to as "another region 220."

When a migration destination resource is found in the own region 220 or in another region 220, the information processing apparatus 100 transmits a request for migrating the first task, to the management apparatus 202. Further, when the information processing apparatus 100 receives the search request 400 to be described later with reference to FIG. 4 from another information processing apparatus 100, the information processing apparatus 100 may search the own region 220 for a migration destination resource. The information processing apparatus 100 is, for example, a server, a PC (Personal Computer), or the like.

The resource apparatus 201 is a computer that has resources and performs any one of a plurality of tasks for forming a service. The resource apparatus 201 is, for example, a server, a PC, or the like. The management apparatus 202 is a computer that controls the migration of a task between resource apparatuses 201 based on a request from the information processing apparatus 100. The management apparatus 202 is, for example, a server, a PC, or the like.

Here, a case has been described where the information processing apparatus 100 measures the load of resources and searches for a migration destination resource, but the present disclosure is not limited thereto. For example, the information processing apparatus 100 may communicate with an apparatus that measures the load of resources, and search for a migration destination resource. In the following description, when the information processing apparatuses 100 need to be distinguished from each other, "#i" may be appended to be described as an "information processing apparatus 100#i." The symbol "i" is a natural number.

Similarly, when the regions 220 need to be distinguished from each other, a region 220 managed by the information processing apparatus 100#i may be referred to as a "region 220#i." Similarly, when the resource apparatuses 201 need to be distinguished from each other, a resource apparatus 201 existing in the region 220#i managed by the information processing apparatus 100#i may be referred to as a "resource apparatus 201#i."

(Example of Hardware Configuration of Information Processing Apparatus 100)

Next, an example of a hardware configuration of the information processing apparatus 100 included in the information processing system 200 illustrated in FIG. 2 will be described with reference to FIG. 3.

Figure 3:
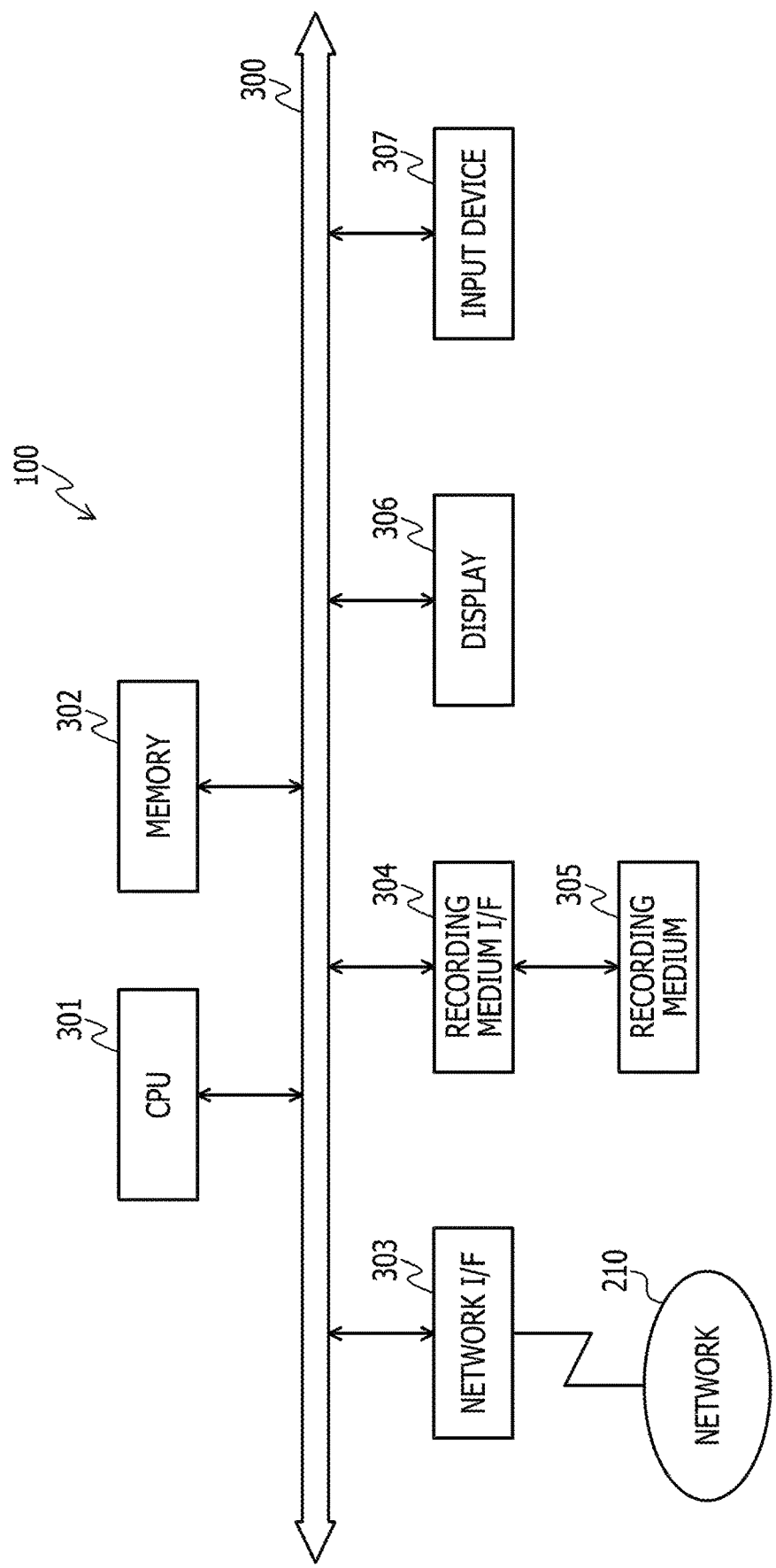
FIG. 3 is a block diagram illustrating an example of a hardware configuration of an information processing apparatus 100.

FIG. 3 is a block diagram illustrating an example of a hardware configuration of the information processing apparatus 100. In FIG. 3, the information processing apparatus 100 includes a CPU (Central Processing Unit) 301, a memory 302, a network I/F (Interface) 303, a recording medium I/F 304, a recording medium 305, a display 306, and an input device 307. These components are coupled to each other by a bus 300.

Here, the CPU 301 controls the entire operation of the information processing apparatus 100. The memory 302 includes, for example, a read only memory (ROM), a random access memory (RAM), a flash ROM or the like. Specifically, for example, a flash ROM or a ROM stores various programs, and a RAM is used as a work area of the CPU 301. A program stored in the memory 302 is loaded into the CPU 301 to cause the CPU 301 to execute a coded process.

The network I/F 303 is coupled to the network 210 through a communication line, and coupled to another computer through the network 210. The network I/F 303 serves as an internal interface with the network 210, and controls input/output of data from/to another computer. The network I/F 303 is, for example, a modem, a LAN adapter, or the like.

The recording medium I/F 304 controls read/write of data from/to the recording medium 305 under the control of the CPU 301. The recording medium I/F 304 is, for example, a disk drive, an SSD (Solid State Drive), a USB (Universal Serial Bus) port, or the like. The recording medium 305 is a nonvolatile memory that stores data written under the control of the recording medium I/F 304. The recording medium 305 is, for example, a disk, a semiconductor memory, a USB memory, or the like. The recording medium 305 may be removable from the information processing apparatus 100.

The display 306 displays data such as documents, images, function information, etc., in addition to a cursor, icons, or tool boxes. The display 306 is, for example, a CRT (Cathode Ray Tube), a liquid crystal display, an organic EL (Electroluminescence) display, or the like. The input device 307 has keys for inputting characters, numerals, various instructions and others, and inputs data. The input device 307 may be a keyboard, a mouse, or the like, or may be a touch panel-type input pad, a numeric keypad, or the like.

The information processing apparatus 100 may include, for example, a printer, a scanner, a microphone, a speaker, and others, in addition to the above-described components. Further, the information processing apparatus 100 may include a plurality of recording media I/Fs 304 and a plurality of recording media 305. Further, the information processing apparatus 100 may not include the recording medium I/F 304 and the recording medium 305.

(Data Structure of Search Request 400)

Next, an example of the data structure of the search request 400 will be described with reference to FIG. 4. The search request 400 is transmitted and received, for example, between information processing apparatuses 100.

Figure 4:
FIG. 4 is an explanatory view illustrating an example of a data structure of a search request 400.

FIG. 4 is an explanatory view illustrating an example of the data structure of the search request 400. As illustrated in FIG. 4, the search request 400 has fields of a transmission source, a search condition, and the number of hops. Identification information for identifying an information processing apparatus 100 which is a transmission source of the search request 400 is set in the transmission source field. A condition for searching for a resource is set in the search condition field. The condition for searching for a resource is, for example, the size of a resource. In the number of hops field, the number of hops is set as the number of times the search request 400 is transferred.

(Contents Stored in Adjacent Region List 500)

Next, an example of the contents stored in the adjacent region list 500 transmitted by the information processing apparatus 100 will be described with reference to FIG. 5. The adjacent region list 500 is implemented by, for example, a storage area such as the memory 302 or the recording medium 305 of the information processing apparatus 100 illustrated in FIG. 3.

Figure 5:
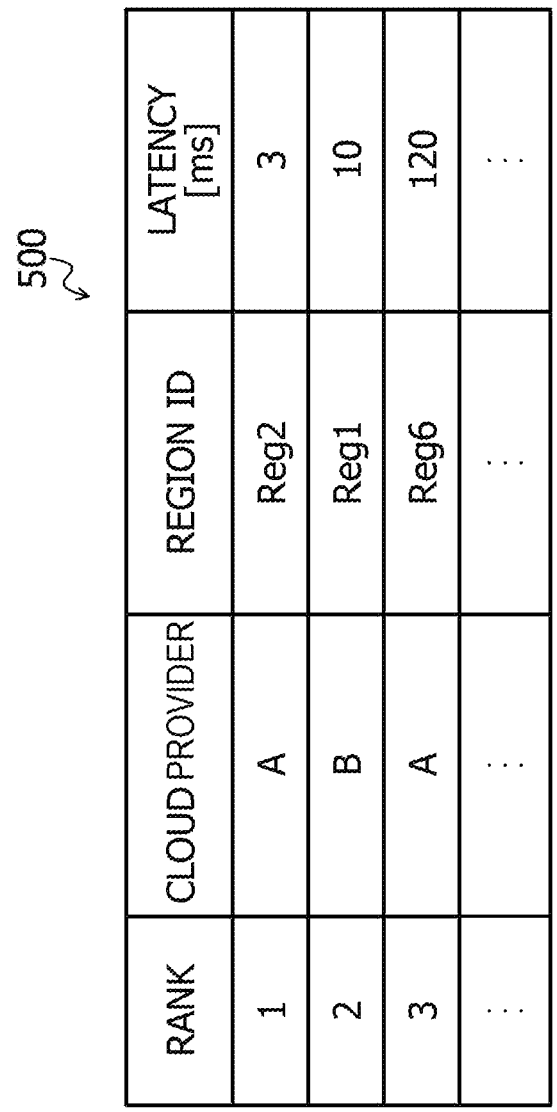
FIG. 5 is an explanatory view illustrating an example of contents stored in an adjacent region list 500.

FIG. 5 is an explanatory view illustrating an example of the contents stored in the adjacent region list 500. As illustrated in FIG. 5, the adjacent region list 500 has fields of a rank, a provider, a region ID, and latency. The adjacent region list 500 stores information on the region 220 as a record by setting information in each field for each region 220.

A rank assigned in an ascending order of the latency between an information processing apparatus 100 that stores the adjacent region list 500 and another information processing apparatus 100 that exists in another region 220 is set in the rank field. Information for identifying a provider that provides another region 220 is set in the provider field. Information for identifying another region 220 is set in the region ID field. The latency between an information processing apparatus 100 that stores the adjacent region list 500 and another information processing apparatus 100 that exists in another region 220 is set in the latency field.

(Contents Stored in Margin Resource Pool Information 600)

Next, an example of the contents stored in the margin resource pool information 600 transmitted by the information processing apparatus 100 will be described with reference to FIG. 6. The margin resource pool information 600 is implemented by, for example, a storage area such as the memory 302 or the recording medium 305 of the information processing apparatus 100 illustrated in FIG. 3.

Figure 6:
FIG. 6 is an explanatory view illustrating an example of contents stored in margin resource pool information 600.

FIG. 6 is an explanatory view illustrating an example of the contents stored in the margin resource pool information 600. As illustrated in FIG. 6, the margin resource pool information 600 has fields of a resource size, a resource ID, an average usage rate, and an update timing. In the margin resource pool information 600, margin resource information is stored as a record by setting information in each field for each resource having a load less than the second threshold value and having a margin in the own region 220.

A resource size indicating the size of a resource where a margin exists is set in the resource size field. The margin is an empty portion of a resource. When the load of a resource is less than the second threshold value, it is determined that an empty portion exists in the resource. A resource ID for identifying a resource where a margin exists is set in the resource ID field. An average usage rate that is a moving average of resource usage rates is set in the average usage rate field. A timing at which the average usage rate is calculated is set in the update timing field.

In the following description, when margin resource pool information 600 stored in each information processing apparatus 100#$i$ needs to be distinguished from the others, "#$i$" may be appended to be described as "margin resource pool information 600#$i$."

(Contents Stored in Shared Resource Pool Information 700)

Next, an example of the contents stored in the shared resource pool information 700 transmitted by the information processing apparatus 100 will be described with reference to FIG. 7. The shared resource pool information 700 is implemented by, for example, a storage area such as the memory 302 or the recording medium 305 of the information processing apparatus 100 illustrated in FIG. 3.

FIG. 7 is an explanatory view illustrating an example of the contents stored in the shared resource pool information 700. As illustrated in FIG. 7, the shared resource pool information 700 has fields of a resource size, a region ID, a resource ID, and an update timing. In the shared resource pool information 700, resource information is stored as a record by setting information in each field for each resource having a load less than the second threshold value and having a margin.

A resource size indicating the size of a resource where a margin exists is set in the resource size field. A region ID for identifying a region 220 including a resource where a margin exists is set in the region ID field. A resource ID for identifying a resource where a margin exists is set in the resource ID field. A timing at which the average usage rate is calculated is set in the update timing field.

In the following description, when shared resource pool information 700 stored in each information processing apparatus 100#$i$ needs to be distinguished from the others, "#$i$" may be appended to be described as "shared resource pool information 700#$i$."

(Example of Hardware Configuration of Resource Apparatus 201)

Next, an example of a hardware configuration of the resource apparatus 201 will be described with reference to FIG. 8.

Figure 8:
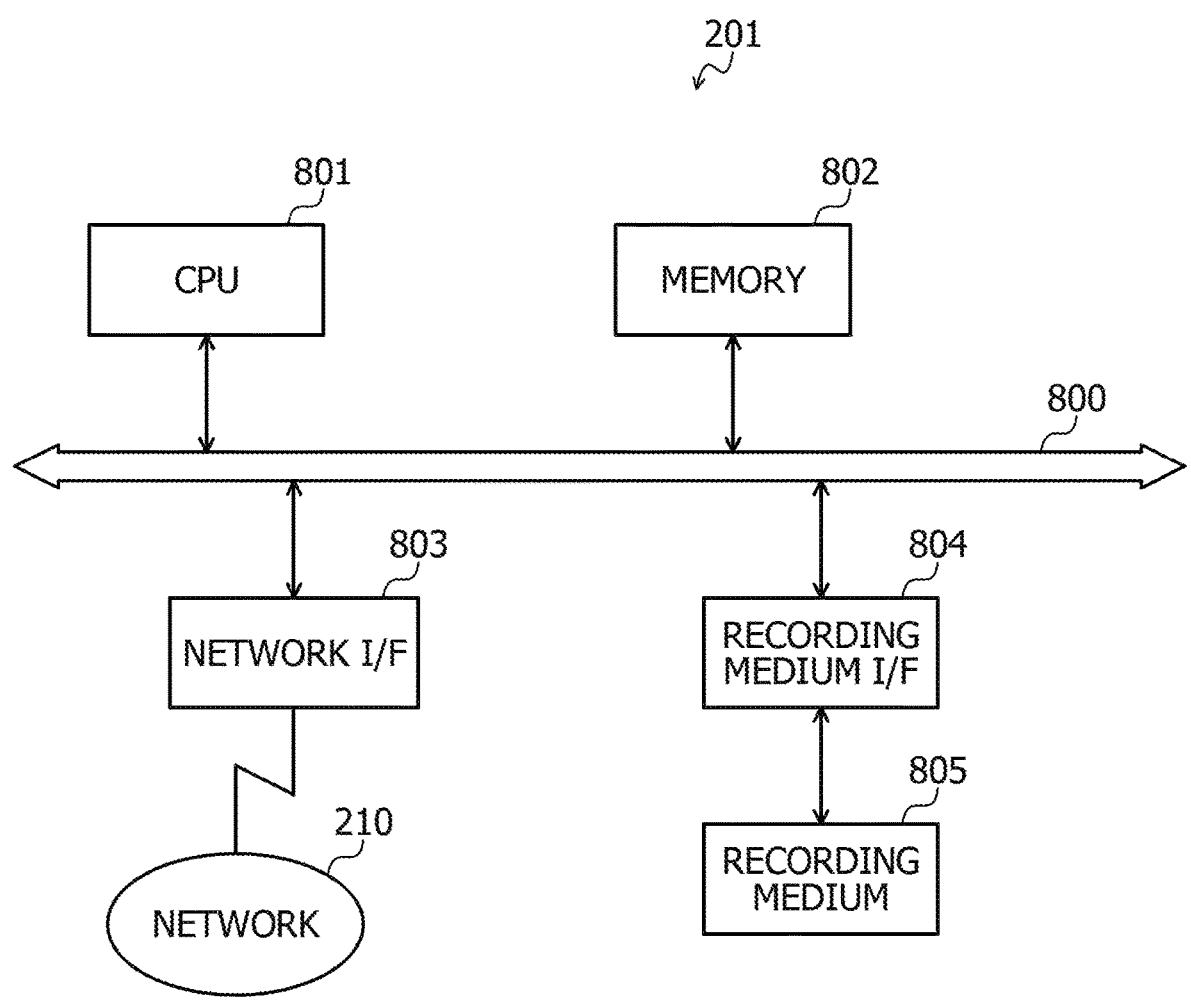
FIG. 8 is a block diagram illustrating an example of a hardware configuration of a resource apparatus 201.

FIG. 8 is a block diagram illustrating an example of a hardware configuration of the resource apparatus 201. In FIG. 8, the resource apparatus 201 includes a CPU 801, a memory 802, a network I/F 803, a recording medium I/F 804, and a recording medium 805. These components are coupled to each other by a bus 800.

Here, the CPU 801 controls the entire operation of the resource apparatus 201. The memory 802 includes, for example, a ROM, a RAM, a flash ROM, or the like. Specifically, for example, a flash ROM or a ROM stores various programs, and a RAM is used as a work area of the CPU 801. A program stored in the memory 802 is loaded into the CPU 801 to cause the CPU 801 to execute a coded process.

The network I/F 803 is coupled to the network 210 through a communication line, and coupled to another computer through the network 210. The network I/F 803 serves an internal interface with the network 210, and controls input/output of data from/to another computer. The network I/F 803 is, for example, a modem, a LAN adapter, or the like.

The recording medium I/F 804 controls read/write of data from/to the recording medium 805 under the control of the CPU 801. The recording medium I/F 804 is, for example, a disk drive, a SSD, a USB port, or the like. The recording medium 805 is a nonvolatile memory that stores data written under the control of the recording medium I/F 804. The recording medium 805 is, for example, a disk, a semiconductor memory, a USB memory, or the like. The recording medium 805 may be removable from the resource apparatus 201.

The resource apparatus 201 may include, for example, a keyboard, a mouse, a display, a printer, a scanner, a microphone, a speaker, and others, in addition to the above-described components. Further, the resource apparatus 201 may include a plurality of recording media I/Fs 804 and a plurality of recording media 805. Further, the resource apparatus 201 may not include the recording medium I/F 804 and the recording medium 805.

(Example of Hardware Configuration of Management Apparatus 202)

Next, an example of a hardware configuration of the management apparatus 202 included in the information processing system 200 illustrated in FIG. 2 will be described with reference to FIG. 2.

Figure 9:
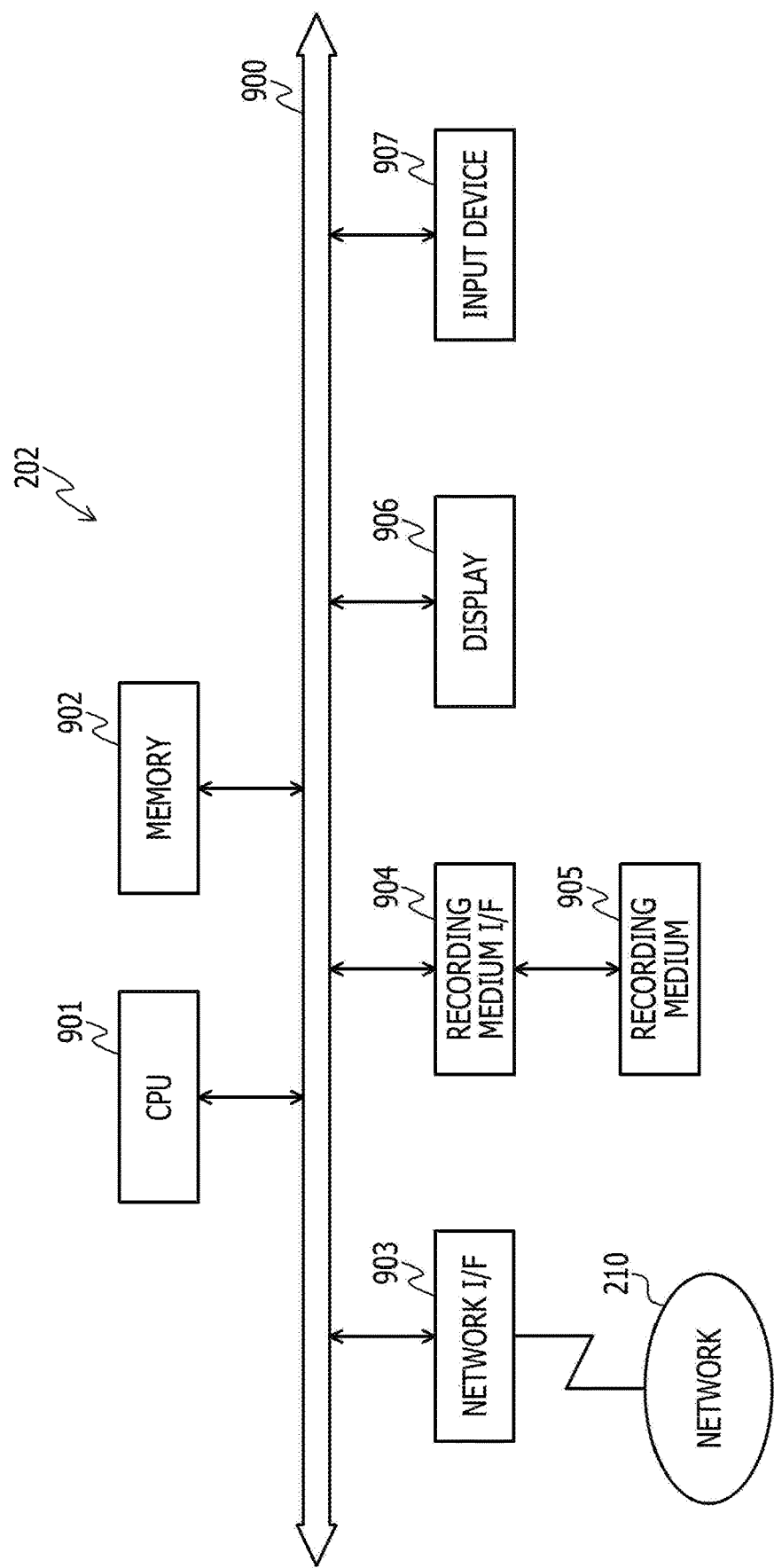
FIG. 9 is a block diagram illustrating an example of a hardware configuration of a management apparatus 202.

FIG. 9 is a block diagram illustrating an example of a hardware configuration of the management apparatus 202. In FIG. 9, the management apparatus 202 includes a CPU 901, a memory 902, a network I/F 903, a recording medium I/F 904, a recording medium 905, a display 906, and an input device 907. These components are coupled to each other by a bus 900.

Here, the CPU 901 controls the entire operation of the management apparatus 202. The memory 902 has, for example, a ROM, a RAM, a flash ROM, or the like. Specifically, for example, a flash ROM or a ROM stores various programs, and a RAM is used as a work area of the CPU 901. A program stored in the memory 902 is loaded into the CPU 901 to cause the CPU 901 to execute a coded process.

The network I/F 903 is coupled to the network 210 via a communication line, and coupled to another computer through the network 210. The network I/F 903 serves as an internal interface with the network 210, and controls input/output of data from/to another computer. The network I/F 903 is, for example, a modem, a LAN adapter, or the like.

The recording medium I/F 904 controls read/write of data from/to the recording medium 905 under the control of the CPU 901. The recording medium I/F 904 is, for example, a disk drive, an SSD, a USB port, or the like. The recording medium 905 is a nonvolatile memory that stores data written under the control of the recording medium I/F 904. The recording medium 905 is, for example, a disk, a semiconductor memory, a USB memory, or the like. The recording medium 905 may be removable from the management apparatus 202.

The display 906 displays data such as documents, images, function information, etc., in addition to a cursor, icons, or tool boxes. The display 906 is, for example, a CRT, a liquid crystal display, an organic EL display, or the like. The input device 907 has keys for inputting characters, numerals, various instructions and others, and inputs data. The input device 907 may be a keyboard, a mouse, or the like, or may be a touch panel-type input pad, a numeric keypad, or the like.

The management apparatus 202 may include, for example, a printer, a scanner, a microphone, a speaker, and others, in addition to the above-described components. Further, the management apparatus 202 may include a plurality of recording media I/Fs 904 and a plurality of recording media 905. Further, the management apparatus 202 may not include the recording medium I/F 904 and the recording medium 905.

(Example of Functional Configuration of Information Processing System 200)

Next, an example of a functional configuration of the information processing system 200 will be described with reference to FIG. 10.

Figure 10:
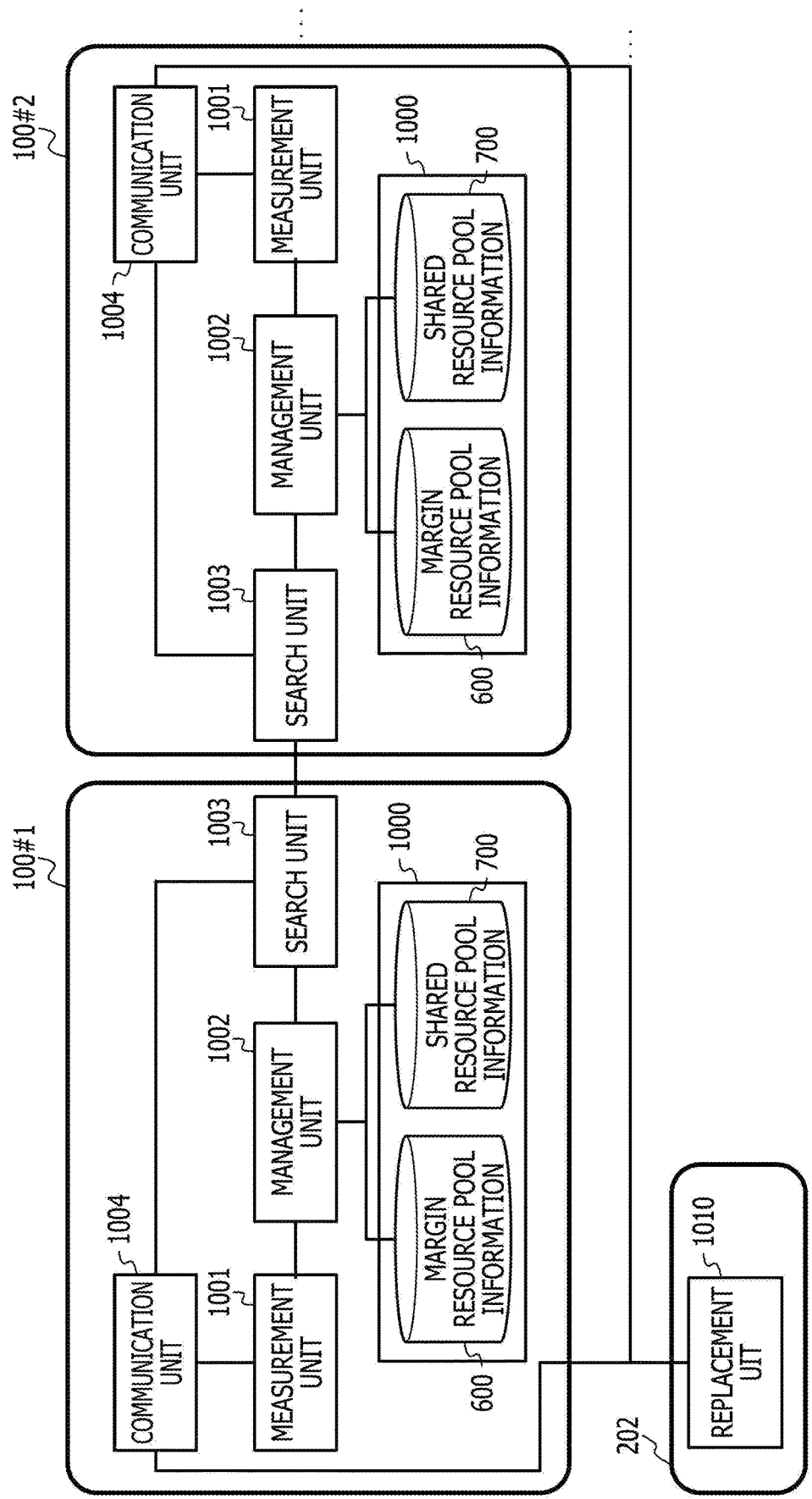
FIG. 10 is a block diagram illustrating an example of a functional configuration of the information processing system 200.

FIG. 10 is a block diagram illustrating an example of a functional configuration of the information processing system 200. The information processing apparatus 100 includes a storage unit 1000, a measurement unit 1001, a management unit 1002, a search unit 1003, and a communication unit 1004. In the following description, an operation of each functional unit will be described taking as an example a case where an information processing apparatus 100#1 corresponds to a first apparatus which is included in a first group among a plurality of groups in a system where the plurality of groups are coupled to each other for a communication, and manages resources included in the first group. This system is, for example, the information processing system 200. In addition, the management apparatus 202 includes a replacement unit 1010.

The storage unit 1000 is implemented by, for example, a storage area such as the memory 302 or the recording medium 305 illustrated in FIG. 3. Hereinafter, a case will be described where the storage unit 1000 is included in the information processing apparatus 100#1, but the present disclosure is not limited thereto. For example, the storage unit 1000 may be included in an apparatus different from the information processing apparatus 100#1, and the contents stored in the storage unit 1000 may be referred to from the information processing apparatus 100#1.

The measurement unit 1001 to the communication unit 1004 function as an example of a controller. Specifically, the measurement unit 1001 to the communication unit 1004 implement their respective functions, for example, by causing the CPU 301 to execute a program stored in a storage area such as the memory 302 or the recording medium 305 illustrated in FIG. 3 or by the network I/F 303. The processing results of each functional unit are stored in a storage area such as the memory 302 or the recording medium 305 illustrated in FIG. 3.

The storage unit 1000 stores a variety of information that is referred to or updated in the processing of each functional unit. The storage unit 1000 stores the first threshold value and the second threshold value. The first threshold value is represented by, for example, a ratio to the size of a resource. The first threshold value is, for example, a threshold value for determining whether or not a task performed using a resource may be migrated to another resource. The task is, for example, an application. The second threshold value is represented by, for example, a ratio to the size of a resource. The second threshold value is, for example, a threshold value for determining whether or not a resource may be migrated. The first threshold value may be, for example, the same value as the second threshold value.

The storage unit 1000 stores the degree of separation between the first group and each of the plurality of groups. The degree of separation between different groups is, for example, the degree of separation between apparatuses that manage resources of different groups, and is specifically the network latency between apparatuses. The degree of separation between apparatuses that manage resources of different groups may be, specifically, a physical distance between apparatuses.

Further, the degree of separation between apparatuses managing resources of different groups may be specifically a physical distance between a place where resources of one group exist and a place where resources of the other group exist. Further, the degree of separation between apparatuses managing resources of different groups may be, specifically, the network latency between resources of one group and apparatuses managing resources of another group. The storage unit 1000 stores, for example, the adjacent region list 500 illustrated in FIG. 5.

The storage unit 1000 stores the results of measuring the load of each resource existing in the first group. The resource is an arithmetic device, a storage device, or a communication band. The load is the usage rate of the arithmetic device, the usage rate of the storage device, or the amount of data input to or output from the communication band. The load is an average value for a predetermined time period. The storage unit 1000 stores, for example, the margin resource pool information 600 illustrated in FIG. 6.

The storage unit 1000 stores the first information. The first information is information that identifies one or more groups including a resource whose load is measured to be less than the second threshold value among a plurality of groups. The first information may include association information. The association information is information that exists in each of one or more groups including a resource whose load is measured to be less than the second threshold value among the plurality of groups, and associates the resource whose load is measured to be less than the second threshold value with a timing at which the load of the resource is measured.

The first information may include information that exists in each of one or more groups including a resource whose load is measured to be less than the second threshold value among the plurality of groups, and identifies the size of the resource whose load is measured to be less than the second threshold value. The storage unit 1000 stores, for example, the shared resource pool information 700 illustrated in FIG. 7.

The measurement unit 1001 measures the load of each resource existing in the first group. Thereby, the measurement unit 1001 may detect that the load of any one resource is equal to or more than the first threshold value in the first group, and thus, a task may be migrated. Further, the measurement unit 1001 may identify a resource which may become a migration destination of the task since the resource exists in the first group, has the load less than the second threshold value, and has a margin.

The management unit 1002 controls the contents stored in the storage unit 1000. The management unit 1002 stores, for example, the result of measuring the load for each resource existing in the first group, in the storage unit 1000. Specifically, the management unit 1002 identifies a resource having the load less than the second threshold value and having a margin based on the measurement result, and updates the margin resource pool information 600. Accordingly, the management unit 1002 may allow the search unit 1003 to refer to a resource which may become a migration destination of the task because the resource exists in the first group, has the load less than the second threshold value, and has a margin.

The management unit 1002 measures, for example, the network latency between the first apparatus and each of a plurality of apparatuses included in different groups, and based on the measured network latency, sets the degree of separation between the first group and each of the plurality of apparatuses. The degree of separation between the first group and any one group of the plurality of groups is represented, for example, by the network latency between the first apparatus and an apparatus included in any one group of the plurality of groups. The degree of separation may be represented, for example, by a number assigned in an ascending order of the network latency. Accordingly, the management unit 1002 may identify the degree of separation between the first group and each of the plurality of groups.

For example, when the first information does not include the association information that associates a resource and a timing within a predetermined time from the current timing with each other, the management unit 1002 updates the first information in communication with one or more apparatuses among the plurality of apparatuses included in different groups. Specifically, the management unit 1002 selects a predetermined number of groups from the plurality of groups in an order from a group closer to the first group. Next, the management unit 1002 communicates with an apparatus included in each of the selected predetermined number of groups, and collects information on a resource which exists in each of the predetermined number of groups and has the load less than the second threshold value. Then, the management unit 1002 updates the first information based on the result of the information collection. Thereby, based on the first information, the management unit 1002 may accurately identify a resource which may become a migration destination of the task because the resource has the load less than the second threshold value and has a margin.

For example, when the first information does not exist, the management unit 1002 generates the first information in communication with one or more apparatuses among the plurality of apparatuses included in different groups. Specifically, the management unit 1002 selects a predetermined number of groups from the plurality of groups in an order from a group closer to the first group. Next, the management unit 1002 communicates with an apparatus that manages each of the selected predetermined number of groups, and collects information on a resource which exists in each of the predetermined number of groups and has the load less than the second threshold value. Then, the management unit 1002 updates the first information based on the result of the information collection. Thereby, based on the first information, the management unit 1002 may identify a resource which may become a migration destination of the task because the resource has the load less than the second threshold value and has a margin.

The search unit 1003 searches for a resource which is a migration destination of the task. Based on the measurement result, when the load of the first resource existing in the first group is equal to or more than the first threshold value, the search unit 1003 searches the first group for a resource which is a migration destination of the first task performed using the first resource. Thereby, the search unit 1003 may find a migration destination resource in the first group.

As a result of the search, when no migration destination resource is found in the first group, the search unit 1003 selects the second group. The second group is, for example, a group other than the first group. For example, based on the first information, the search unit 1003 identifies one or more groups including a resource whose load is measured to be less than the second threshold value, among the plurality of groups. Then, the search unit 1003 refers to the degree of separation between each of the identified one or more groups and the first group, and selects the second group from the one or more groups. Specifically, the search unit 1003 selects the second group from the identified one or more groups in an order in which the degree of separation from the first group is closer. As a result, the search unit 1003 may select a group including a resource which is unlikely to cause the degradation in service performance due to the network latency even when the first task is migrated since the group is relatively close to the first group, as the second group.

For example, the search unit 1003 refers to the degree of separation between each of the identified one or more groups and the first group, and selects the second group including a resource whose load is less than the second threshold value even when the first task is migrated, from the identified one or more groups. As a result, the search unit 1003 may select a group including a resource which is unlikely to cause the degradation in service performance due to the network latency even when the first task is migrated since the group is relatively close to the first group, as the second group. Further, the search unit 1003 may prevent the load of the migration destination resource from becoming equal to or more than the second threshold value even when the first task is migrated, thereby preventing the degradation in service performance.

The search unit 1003 transmits the search request 400 for searching for a migration destination resource to the second apparatus included in the selected second group. The second apparatus is, for example, an apparatus other than the first apparatus. The second apparatus corresponds to another information processing apparatus 100. The search unit 1003 transmits the first information to the second apparatus when transmitting the search request 400 for searching for a migration destination resource to the selected second apparatus. Accordingly, the search unit 1003 may cause the second apparatus to search the second group for a migration destination resource.

As a result of transmitting the search request 100, when the second resource which is the migration destination is found in the second group, the search unit 1003 receives the second information transmitted from the second apparatus. The second information is information that identifies one or more groups including a resource whose load is measured to be less than the second threshold value among the plurality of groups. The second information may include association information. The association information is information that exists in each of one or more groups including a resource whose load is measured to be less than the second threshold value among the plurality of groups, and associates the resource whose load is measured to be less than the second threshold value with a timing at which the load of the resource is measured. Accordingly, in order to cause the second apparatus to search the second group for a migration destination resource, the search unit 1003 may collect information for updating the first information at an opportunity to communicate with the second apparatus, thereby reducing the traffic amount.

As a result of transmitting the search request 400, when the second resource that is the migration destination is found in the second group, the search unit 1003 receives information indicating the second resource that is the migration destination from the second apparatus. Thereby, the search unit 1003 may identify the second resource that is the migration destination.

As a result of transmitting the search request 400, when the search request 400 is transferred to a third apparatus via the second apparatus, and a third resource that is the migration destination is found in a third group, the search unit 1003 receives third information transmitted from the third apparatus. The third apparatus is an apparatus included in the third group of the plurality of groups, among the plurality of apparatuses included in different groups. The third apparatus is, for example, an apparatus other than the first apparatus and the second apparatus. The third apparatus corresponds to another information processing apparatus 100. The third information is information that identifies one or more groups including a resource whose load is measured to be less than the second threshold value among the plurality of groups. Thereby, the search unit 1003 may collect information for updating the first information at an opportunity to communicate with the third apparatus via the second apparatus, thereby reducing the traffic amount.

As a result of transmitting the search request 400, when the search request 400 is transferred to the third apparatus via the second apparatus, and the third resource that is the migration destination is found in the third group, the search unit 1003 receives information indicating the third resource that is the migration destination, transmitted from the third apparatus. Thereby, the search unit 1003 may identify the third resource that is the migration destination.

The management unit 1002 updates the first information based on the second information. The management unit 1002 updates the first information based on, for example, a result of a product set of the association information included in the first information and the association information included in the second information. Thereby, the management unit 1002 may update the first information to a state relatively close to the latest. Further, the management unit 1002 may effectively update the first information with the second information that is determined to be useful from the viewpoint of searching for a migration destination resource.

The management unit 1002 updates the first information based on the third information. The management unit 1002 updates the first information based on, for example, a result of a product set of the association information included in the first information and the association information included in the third information. Thereby, the management unit 1002 may update the first information to a state relatively close to the latest. In addition, the management unit 1002 may effectively update the first information with the third information that is determined to be useful from the viewpoint of searching for a migration destination resource.

The communication unit 1004 outputs an instruction to migrate a task. For example, as a result of the search, when a migration destination is found in the first group, the communication unit 1004 outputs an instruction to migrate the first task to the migration destination resource found in the first group. Specifically, the communication unit 1004 transmits an instruction to migrate the first task to the migration destination resource found in the first group, to the resource apparatus 201 corresponding to the migration destination resource found in the first group. Thereby, the communication unit 1004 may suppress the performance degradation of the service formed by the first task.

For example, as a result of the search, when the migration destination resource is found in the first group, the communication unit 1004 outputs an instruction to migrate a task performed using the migration destination resource found in the first group to the first resource. Specifically, the communication unit 1004 transmits an instruction to migrate a task performed using the migration destination resource found in the first group to the first resource, to the resource apparatus 201 corresponding to the first resource. Thereby, the communication unit 1004 may suppress an increase in the load of the migration destination resource found in the first group.

For example, based on the information indicating the second resource, the communication unit 1004 outputs an instruction to migrate the first task to the second resource. Specifically, the communication unit 1004 transmits an instruction to migrate the first task to the second resource, to the management apparatus 202. Thereby, the communication unit 1004 may suppress the performance degradation of the service formed by the first task.

For example, based on the information indicating the second resource, the communication unit 1004 outputs an instruction to migrate the second task performed using the second resource to the first resource. Specifically, the communication unit 1004 transmits an instruction to migrate the second task to the first resource, to the management apparatus 202. Thereby, the communication unit 1004 may suppress an increase in the load of the second resource.

For example, based on the information indicating the third resource, the communication unit 1004 outputs an instruction to migrate the first task to the third resource. Specifically, the communication unit 1004 transmits an instruction to migrate the first task to the third resource, to the management apparatus 202. Thereby, the communication unit 1004 may suppress the performance degradation of the service formed by the first task.

For example, based on the information indicating the third resource, the communication unit 1004 outputs an instruction to migrate the third task performed using the third resource to the first resource. Specifically, the communication unit 1004 transmits an instruction to migrate the third task to the first resource, to the management apparatus 202. Thereby, the communication unit 1004 may suppress an increase in the load of the third resource.

When the search request 400 is received, the search unit 1003 searches the first group for a resource that is the migration destination of the task. For example, the search unit 1003 receives the search request 400 transmitted from a fourth apparatus included in a fourth group among the plurality of apparatuses included in different groups. The search request 400 transmitted from the fourth apparatus requests to search for a migration destination resource of a fourth task performed using the fourth resource that exists in the fourth group and has the load equal to or more than the first threshold value. Then, the search request 400 transmitted from the fourth apparatus is received, the search unit 1003 searches the first group for a resource that is the migration destination of the fourth task. Thereby, the search unit 1003 may find a resource that is the migration destination of the fourth task, thereby suppressing the performance degradation of the service formed by the fourth task.

As a result of the search, when a resource that is the migration destination of the fourth task is found in the first group, the search unit 1003 transmits information indicating the resource that is found as the migration destination of the fourth task in the first group, to the fourth apparatus. Thereby, the search unit 1003 may enable the fourth apparatus to output an instruction to migrate the fourth task.

As a result of the search, when a resource that is the migration destination of the fourth task is found in the first group, the search unit 1003 transmits the first information to the fourth apparatus. Thereby, the search unit 1003 may transmit the first information to the fourth apparatus at an opportunity to communicate with the fourth apparatus to cause the fourth apparatus to collect the information, thereby reducing the traffic amount.

As a result of the search, when a resource that is the migration destination of the fourth task is not found in the first group, the search unit 1003 transfers the search request 400. For example, based on the first information, the search unit 1003 transfers the search request 400 to a fifth apparatus included in a fifth group among the plurality of apparatuses included in different groups. The fifth apparatus corresponds to another information processing apparatus 100. Specifically, based on the first information, the search unit 1003 identifies one or more groups including a resource whose load is measured to be less than the second threshold value. Next, the search unit 1003 selects the fifth group that is relatively close in the degree of separation to the first group, from the identified one or more groups. Then, the search unit 1003 transfers the search request 400 to the fifth apparatus included in the selected fifth group. Thereby, the search unit 1003 may select a group including a resource that is unlikely to cause the degradation in service performance due to network latency even when the fourth task is migrated because the resource is relatively close to the first group, as the fifth group. Then, the search unit 1003 may search the fifth group for a resource that is the migration destination of the fourth task.

Based on the number of times the search request 400 has been transferred from the fourth apparatus to the first apparatus, the search unit 1003 may determine whether to transfer the search request 400 to the fifth apparatus. The search unit 1003 determines whether to transfer the search request 400 to the fifth apparatus, such that, for example, the greater the number of times the search request 400 is transferred, the lower the probability of transferring the search request 400 to the fifth apparatus. Thereby, the search unit 1003 does not transfer the search request 400 in a situation where the probability of the performance degradation of the service formed by the fourth task is relatively high even when the fourth task is migrated since the search unit 1003 is relatively far from the fourth device, thereby reducing the traffic amount.

The replacement unit 1010 receives an instruction to migrate a task, and migrates the task between resource apparatuses 201 according to the instruction. Thereby, the replacement unit 1010 may reduce the ratio of the resource load to the resource size between resource apparatuses 201, thereby preventing the performance degradation of the service formed by the migrated task.

Moreover, the information processing apparatus 100#1 may include an output unit. The output unit outputs a processing result of any one of the functional units. The output format is, for example, display on a display, print output to a printer, transmission to an external device by a network I/F 303, or storage in a storage area such as the memory 302 or the recording medium 305. Thus, the output unit may enable a user to grasp the processing result of each functional unit.

(Example of Operation of Information Processing System 200)

Next, an operation example of the information processing system 200 will be described with reference to FIGS. 11 to 13.

Figure 11:
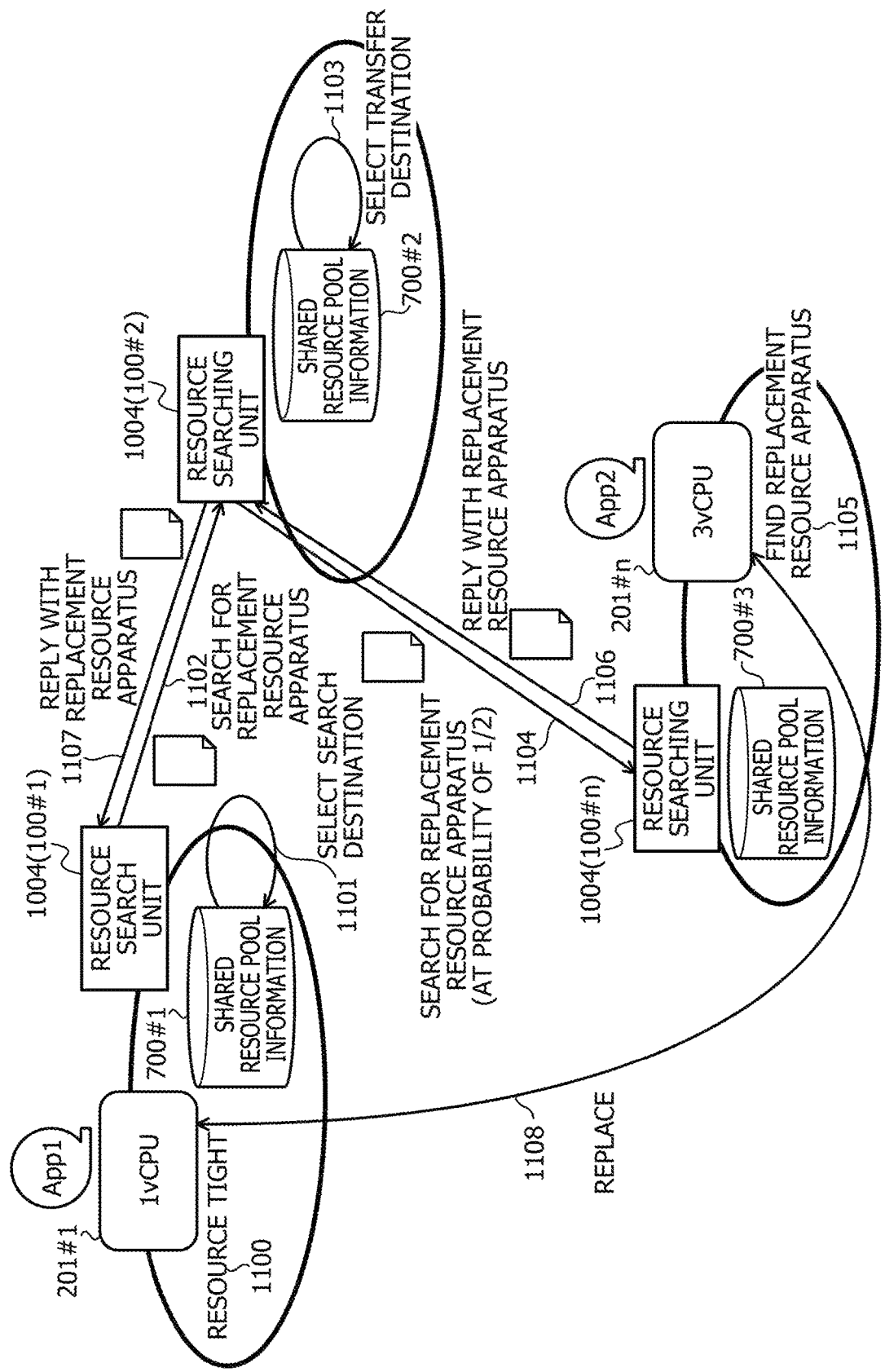
FIG. 11 is an explanatory view (part 1) illustrating an example of an operation of the information processing system 200.
Figure 12:
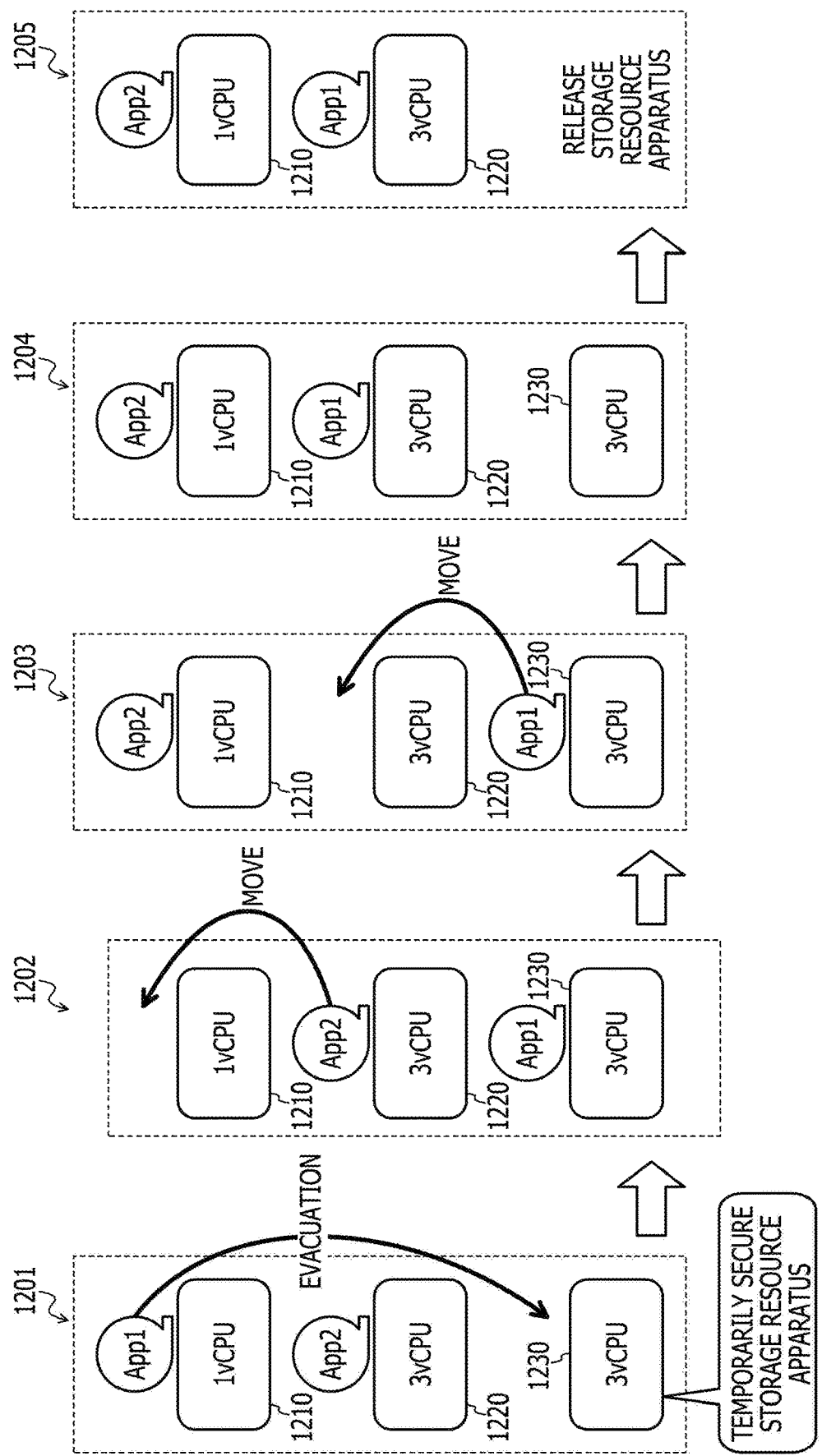
FIG. 12 is an explanatory view (part 2) illustrating an example of an operation of the information processing system 200.
Figure 13:
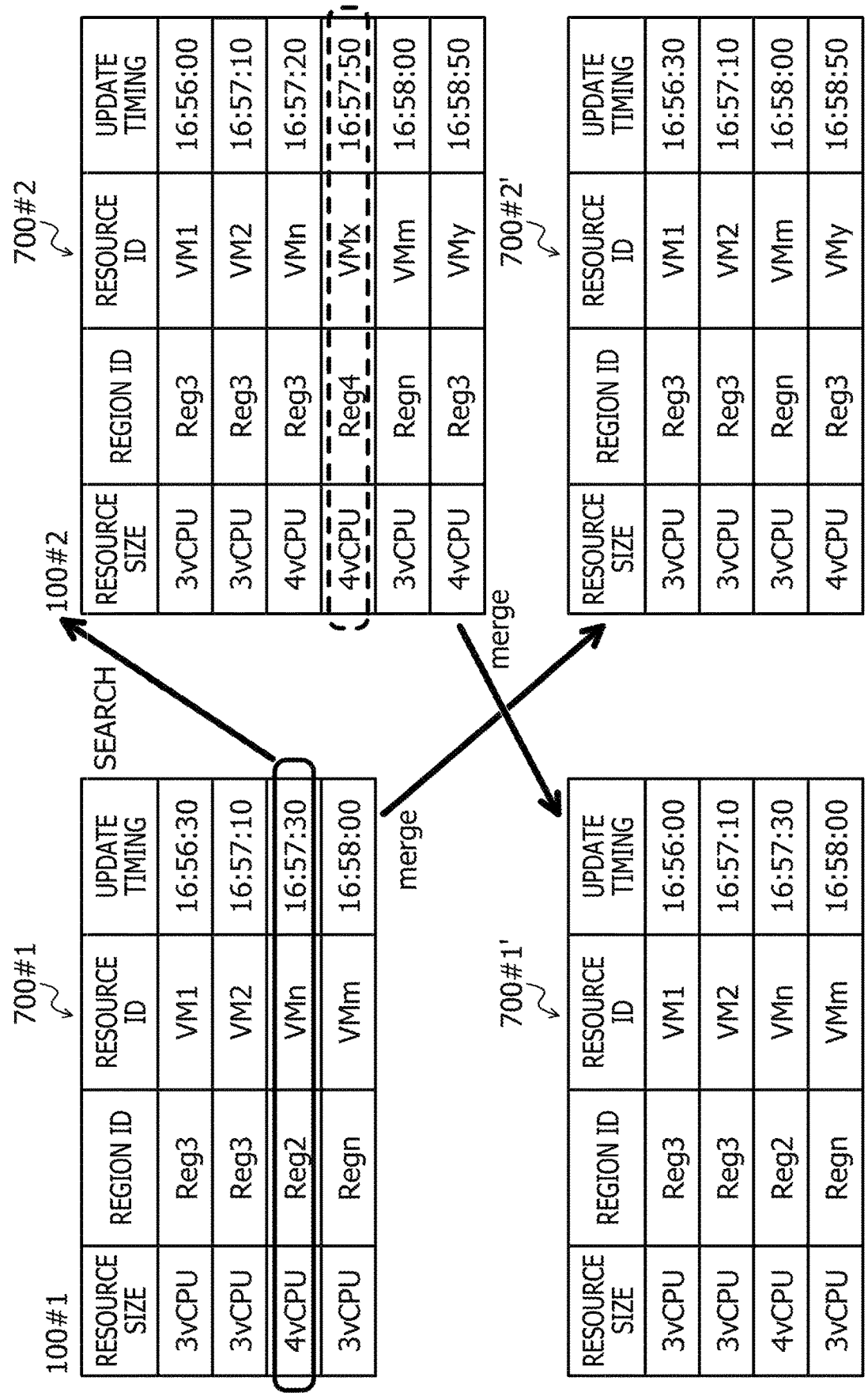
FIG. 13 is an explanatory view (part 3) illustrating an example of an operation of the information processing system 200.

FIGS. 11 to 13 are explanatory view illustrating an example of the operation of the information processing system 200. In FIG. 11, (11-0) the information processing apparatus 100#1 detects that there is a tight resource apparatus 201#1 in the own region 220#1, as denoted by a reference numeral 1100. When the load of the resource apparatus 201#1 is equal to or more than the first threshold value, it is determined that the resource apparatus 201#1 has become tight. The tight resource apparatus 201#1 has 1 vCPU and executes an application App1. The vCPU is, for example, a virtual machine.

Based on the margin resource pool information 600#1, the information processing apparatus 100#1 searches the own region 220#1 for a replacement resource apparatus 201#1 that is a migration destination of the application App1. The replacement resource apparatus 201#1 is a resource apparatus 201#1 that has more vCPUs than the tight resource apparatus 201#1 and has a margin. When the load of the resource apparatus 201#1 is less than the second threshold value, it is determined that a margin exists. The replacement resource apparatus 201#1 may be executing an application. The replacement resource apparatus 201#1 may be executing an application having the load smaller load than the application App1.

Here, when the replacement resource apparatus 201#1 is found in the own region 220#1, the information processing apparatus 100#1 migrates the application App1 from the tight resource apparatus 201#1 to the replacement resource apparatus 201#1. When the replacement resource apparatus 201#1 is also executing the application, the information processing apparatus 100#1 replaces the applications that are being executed, between the tight resource apparatus 201#1 and the replacement resource apparatus 201#1. Thereby, the information processing apparatus 100#1 may suppress the performance degradation of the service formed by the application App1.

In the example of FIG. 11, it is assumed that the information processing apparatus 100#1 finds no replacement resource apparatus 201#1 in the own region 220#1.

(11-1) Since the replacement resource apparatus 201#1 is not found in the own region 220#1, the information processing apparatus 100#1 selects a transmission destination of the search request 400 based on shared resource pool information 700#1, as indicated by an arrow 1101. In the example of FIG. 11, the information processing apparatus 100#1 selects an information processing apparatus 100#2 having the smallest latency with the own apparatus, as the transmission destination of the search request 400.

(11-2) The information processing apparatus 100#1 transmits the search request 400 to the selected information processing apparatus 100#2, as indicated by an arrow 1102.

(11-3) The information processing apparatus 100#2 receives the search request 400. Based on the margin resource pool information 600#2, the information processing apparatus 100#2 searches the own region 220#2 for a replacement resource apparatus 201#2 that is the migration destination of the application App1. The replacement resource apparatus 201#2 is a resource apparatus 201#2 that has more vCPUs than the tight resource apparatus 201#1 and has a margin. When the load of the resource apparatus 201#2 is less than the second threshold value, it is determined that a margin exists. The replacement resource apparatus 201#2 may be executing an application. The replacement resource apparatus 201#2 may be executing an application having a smaller load than the application App1.

Here, when the replacement resource apparatus 201#2 is found in the own region 220#2, the information processing apparatus 100#2 transmits shared resource pool information 700#2 to the information processing apparatus 100#1 along with the information indicating the found replacement resource apparatus 201#2. Thereby, the information processing apparatus 100#1 may cause the management apparatus 202 to replace the applications that are being executed, between the tight resource apparatus 201#1 and the replacement resource apparatus 201#2. Thus, the information processing apparatus 100#1 may suppress the performance degradation of the service formed by the application App1. Further, the information processing apparatus 100#1 may update the shared resource pool information 700#1 based on the received shared resource pool information 700#2 while reducing the traffic amount. The information processing apparatus 100#1 may, for example, merge the received shared resource pool information 700#2 with the shared resource pool information 700#1.

In the example of FIG. 11, it is assumed that the information processing apparatus 100#2 finds no replacement resource apparatus 201#2 in the own region 220#2. The information processing apparatus 100#2 increments the number of hops of the search request 400, and determines whether to transfer the search request 400 with a probability of 1/the number of hops. When it is determined not to transfer the search request 400, the information processing apparatus 100#2 transmits a notification of a search failure to the information processing apparatus 100#1.

In the example of FIG. 11, it is assumed that the information processing apparatus 100#2 determines to transfer the search request 400. The information processing apparatus 100#2 selects a transfer destination of the search request 400 based on the shared resource pool information 700#2, as indicated by an arrow 1103. In the example of FIG. 11, the information processing apparatus 100#2 selects an information processing apparatus 100#n having the smallest latency with the own apparatus, as the transmission destination of the search request 400, except for the information processing apparatus 100#1.

(11-4) The information processing apparatus 100#2 transfers the search request 400 to the selected information processing apparatus 100#n, as indicated by an arrow 1104.

(11-5) The information processing apparatus 100#n receives the search request 400. The information processing apparatus 100#n searches the own region 220#n for a replacement resource apparatus 201#n that is the migration destination of the application App1 based on margin resource pool information 600#n, as denoted by a reference numeral 1105. The replacement resource apparatus 201#n is a resource apparatus 201#n that has more vCPUs than the tight resource apparatus 201#1 and has a margin. When the load of the resource apparatus 201#n is less than the second threshold value, it is determined that a margin exists. The replacement resource apparatus 201#n may be executing an application. The replacement resource apparatus 201#n may be executing an application having a smaller load than the application App1.

In the example of FIG. 11, it is assumed that the information processing apparatus 100#n finds the replacement resource apparatus 201#n in the own region 220#n. In the example of FIG. 11, it is also assumed that the replacement resource apparatus 201#n is executing an application App2.

(11-6) The information processing apparatus 100#n transmits shared resource pool information 700#n to the information processing apparatus 100#2 along with the information indicating the found replacement resource apparatus 201#n, as indicated by an arrow 1106.

(11-7) The information processing apparatus 100#2 receives the shared resource pool information 700#n along with the information indicating the found replacement resource apparatus 201#n. The information processing apparatus 100#2 transfers the shared resource pool information 700#n to the information processing apparatus 100#1 along with the information indicating the found replacement resource apparatus 201#n, as indicated by an arrow 1107.

(11-8) The information processing apparatus 100#1 receives the shared resource pool information 700#n along with the information indicating the found replacement resource apparatus 201#n. The information processing apparatus 100#1 causes the management apparatus 202 to replace the applications that are being executed, between the tight resource apparatus 201#1 and the replacement resource apparatus 201#n, as indicated by an arrow 1108. An example in which the management apparatus 202 replaces the application will be specifically described later with reference to FIG. 12. Thereby, the information processing apparatus 100#1 may suppress the performance degradation of the service formed by the application App1.

Further, the information processing apparatus 100#1 updates the shared resource pool information 700#1 based on the received shared resource pool information 700#2. For example, the information processing apparatus 100#1 merges the received shared resource pool information 700#2 with the shared resource pool information 700#1. An example of merging the information will be specifically described later with reference to FIG. 13. Thereby, the information processing apparatus 100#1 may reduce the traffic amount required for updating the shared resource pool information 700#1.

Here, the case where the shared resource pool information 700 is transmitted between information processing apparatuses 100 has been described, but the present disclosure is not limited thereto. For example, the margin resource pool information 600 may be transmitted between information processing apparatuses 100. In this case, an information processing apparatus 100 updates the shared resource pool information 700 of the own apparatus based on the margin resource pool information 600 of another information processing apparatus 100.

Next, an example in which the management apparatus 202 replaces the applications that are being executed, between resource apparatuses 201 will be described with reference to FIG. 12. In the example of FIG. 12, a resource apparatus 1210 has 1 vCPU and is executing the application App1. In addition, a resource apparatus 1220 has 3 vCPU and is executing the application App2.

In the following description, a case will be described where the management apparatus 202 replaces the applications App1 and App2 that are being executed, between the resource apparatus 1210 and the resource apparatus 1220. At this time, the management apparatus 202 secures a resource apparatus 1230 used for the replacement task.

First, the management apparatus 202 migrates the application App1 from the resource apparatus 1210 to the resource apparatus 1230, as denoted by a reference numeral 1201. Next, the management apparatus 202 migrates the application App2 from the resource apparatus 1220 to the resource apparatus 1210, as denoted by a reference numeral 1202. Then, the management apparatus 202 migrates the application App1 from the resource apparatus 1230 to the resource apparatus 1220, as denoted by a reference numeral 1203.

Thereby, the management apparatus 202 may replace the applications App1 and App2 that are being executed, between the resource apparatus 1210 and the resource apparatus 1220, as denoted by a reference numeral 1204. Thereafter, the management apparatus 202 releases the resource apparatus 1230 used for the replacement task, as denoted by a reference numeral 1205.

Next, an example of merging the shared resource pool information 700 will be described with reference to FIG. 13. The information processing apparatus 100#1 stores the shared resource pool information 700#1. The information processing apparatus 100#2 stores the shared resource pool information 700#2. When the shared resource pool information 700#2 is received, the information processing apparatus 100#1 merges the shared resource pool information 700#2 with the shared resource pool information 700#1.

For example, the information processing apparatus 100#1 leaves one or more records of the shared resource pool information 700#1 that overlap with the shared resource pool information 700#2, in the shared resource pool information 700#1. The information processing apparatus 100#1 identifies a period from the first update timing to the last update timing in the one or more records of the shared resource pool information 700#1 that overlap with the shared resource pool information 700#2.

The information processing apparatus 100#1 determines whether to leave a record of the shared resource pool information 700#1 having an update timing out of the identified period, in the shared resource pool information 700#1. The information processing apparatus 100#1 determines to leave the record in the shared resource pool information 700#1, with a probability corresponding to the reciprocal of the rank of the region 220 indicated by the record in the adjacent region list 500.

Thereby, the information processing apparatus 100#1 may update the shared resource pool information 700#1 to shared resource pool information 700#1'. Thus, the information processing apparatus 100#1 may leave a record useful from the viewpoint of searching for the replacement resource apparatus 201, in the shared resource pool information 700#1.

Similarly, the information processing apparatus 100#2 may update the shared resource pool information 700#2 to shared resource pool information 700#2'. Thus, the information processing apparatus 100#2 may leave a record useful from the viewpoint of searching for the replacement resource apparatus 201, in the shared resource pool information 700#2.

(Overall Processing Procedure)

Next, an example of the overall processing procedure executed by the information processing apparatus 100 will be described with reference to FIG. 14. The overall processing is implemented by, for example, the CPU 301, the storage area such as the memory 302 or the recording medium 305, and the network I/F 303 which are illustrated in FIG. 3.

Figure 14:
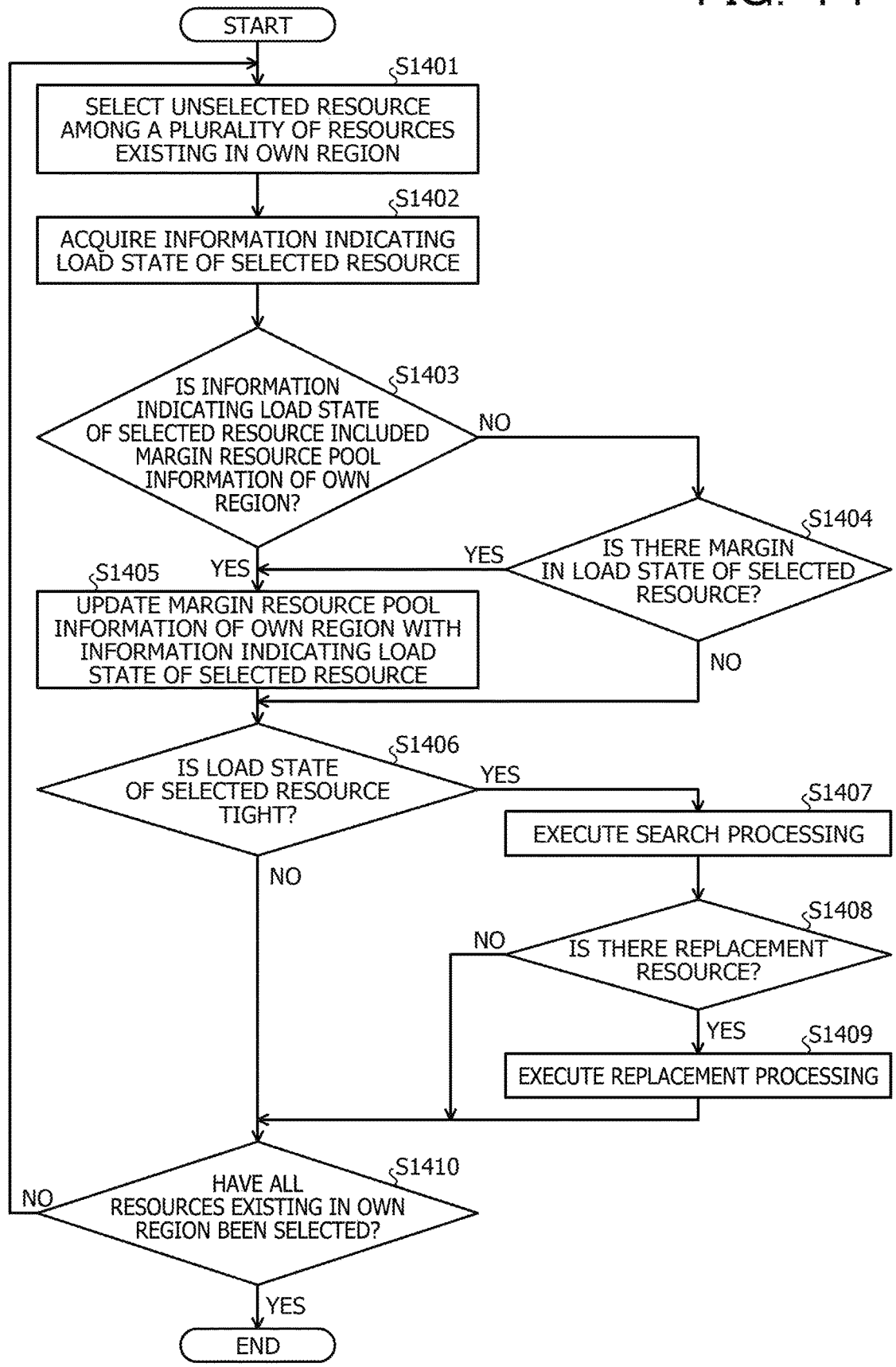
FIG. 14 is a flowchart illustrating an example of an overall processing procedure.

FIG. 14 is a flowchart illustrating an example of the overall processing procedure. In FIG. 14, the information processing apparatus 100 selects an unselected resource among a plurality of resources existing in the own region 220 (step S1401).

Next, the information processing apparatus 100 acquires information indicating the load state of the selected resource (step S1402). Then, the information processing apparatus 100 determines whether or not the information indicating the load state of the selected resource is included in the margin resource pool information 600 of the own region 220 (step S1403).

Here, when it is determined that the information is included in the margin resource pool information 600 of the own region 220 (step S1403: Yes), the information processing apparatus 100 proceeds to the process of step S1405. Meanwhile, when it is determined that the information is not included in the margin resource pool information 600 of the own region 220 (step S1403: No), the information processing apparatus 100 proceeds to the process of step S1404.

In step S1404, the information processing apparatus 100 determines whether or not there is a margin in the load state of the selected resource (step S1404).

Here, when it is determined that there is no margin (step S1404: Yes), the information processing apparatus 100 proceeds to the process of step S1406. Meanwhile, when it is determined that there is a margin (step S1404: Yes), the information processing apparatus 100 proceeds to the process of step S1405.

In step S1405, the information processing apparatus 100 updates the margin resource pool information 600 of the own region 220 with the information indicating the load state of the selected resource (step S1405). Then, the information processing apparatus 100 proceeds to the process of step S1406.

In step S1406, the information processing apparatus 100 determines whether or not the load state of the selected resource is tight (step S1406).

Here, when it is determined that the load state of the selected resource is not tight (step S1406: No), the information processing apparatus 100 proceeds to the process of step S1410. Meanwhile, when it is determined that the load state of the selected resource is tight (step S1406: Yes), the information processing apparatus 100 proceeds to the process of step S1407.

In step S1407, the information processing apparatus 100 executes a search processing to be described later with reference to FIG. 15 (step S1407). Then, the information processing apparatus 100 determines whether or not there is a replacement resource (step S1408).

Here, when it is determined that there is no replacement resource (step S1408: Yes), the information processing apparatus 100 proceeds to the process of step S1410. Meanwhile, when it is determined that there is a replacement resource (step S1408: Yes), the information processing apparatus 100 proceeds to the process of step S1409.

In step S1409, the information processing apparatus 100 executes a replacement processing (step S1409). Then, the information processing apparatus 100 proceeds to the process of step S1410.

In step S1410, the information processing apparatus 100 determines whether or not all of the resources existing in the own region 220 have been selected (step S1410).

Here, when it is determined that there is an unselected resource (step S1410: No), the information processing apparatus 100 returns to the process of step S1401. Meanwhile, when it is determined that all of the resources have been selected (step S1410: Yes), the information processing apparatus 100 ends the entire process.

(Search Processing Procedure)

Next, an example of a search processing procedure executed by the information processing apparatus 100 will be described with reference to FIG. 15. The search processing is implemented by, for example, the CPU 301, the storage area such as the memory 302 or the recording medium 305, and the network I/F 303 which are illustrated in FIG. 3.

Figure 15:
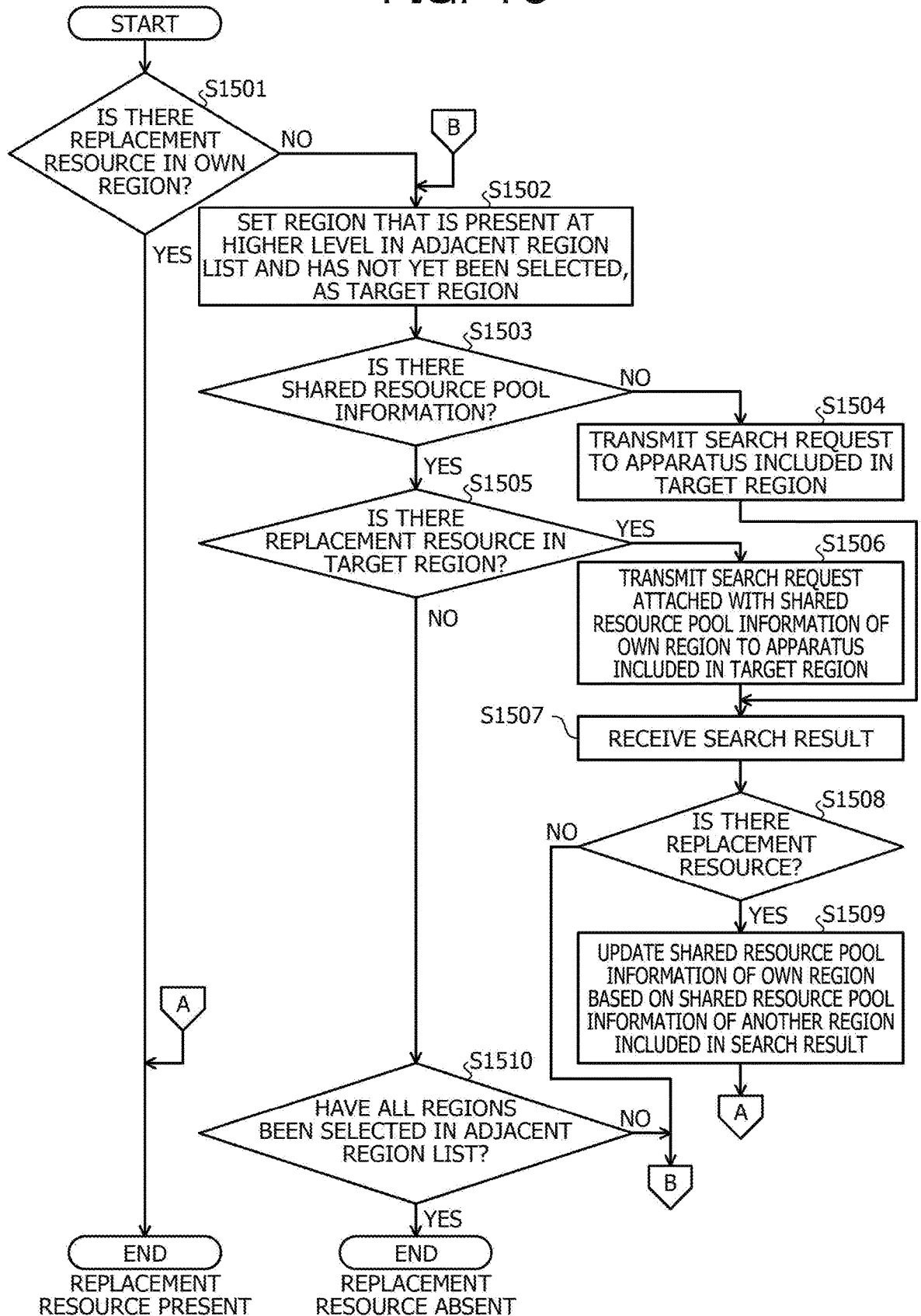
FIG. 15 is a flowchart illustrating an example of a search processing procedure.

FIG. 15 is a flowchart illustrating an example of the search processing procedure. In FIG. 15, the information processing apparatus 100 determines whether or not there is a replacement resource in the own region 220, based on the margin resource pool information 600 of the own region 220 (step S1501).

Here, when it is determined that there is a replacement resource in the own region 220 (step S1501: Yes), the information processing apparatus 100 ends the search processing. Meanwhile, when it is determined that there is no replacement resource in the own region 220 (step S1501: No), the information processing apparatus 100 proceeds to the process of step S1502.

In step S1502, the information processing apparatus 100 sets a region 220 that is present at a higher level in the adjacent region list 500 and has not yet been selected, as a target region 220 (step S1502). Then, the information processing apparatus 100 determines whether or not there is the shared resource pool information 700 (step S1503).

Here, when it is determined that there is no shared resource pool information 700 (step S1503: No), the information processing apparatus 100 proceeds to the process of step S1504. Meanwhile, when it is determined that there is the shared resource pool information 700 (step S1503: Yes), the information processing apparatus 100 proceeds to the process of step S1505.

In step S1504, the information processing apparatus 100 transmits a search request to an apparatus included in the target region 220 (step S1504). Then, the information processing apparatus 100 proceeds to the process of step S1507.

In step S1505, the information processing apparatus 100 determines whether or not there is a replacement resource in the target region 220, based on the shared resource pool information 700 (step S1505).

Here, when it is determined that there is a replacement resource in the target region 220 (step S1505: Yes), the information processing apparatus 100 proceeds to the process of step S1506. Meanwhile, when it is determined that there is no replacement resource in the target region 220 (step S1505: No), the information processing apparatus 100 proceeds to the process of step S1510.

In step S1506, the information processing apparatus 100 transmits the search request attached with the shared resource pool information 700 of the own region 220, to the apparatus included in the target region 220 (step S1506). Then, the information processing apparatus 100 proceeds to the process of step S1507.

In step S1507, the information processing apparatus 100 receives the search result (step S1507). Then, the information processing apparatus 100 determines whether or not there is a replacement resource based on the search result (step S1508).

Here, when it is determined that there is a replacement resource (step S1508: Yes), the information processing apparatus 100 proceeds to the process of step S1509. Meanwhile, when it is determined that there is no replacement resource (step S1508: No), the information processing apparatus 100 returns to the process of step S1502.

In step S1509, the information processing apparatus 100 updates the shared resource pool information 700 of the own region 220, based on the shared resource pool information 700 of another region 220 included in the search result (step S1509). Then, the information processing apparatus 100 ends the search processing.

In step S1510, the information processing apparatus 100 determines whether or not all of the regions 220 have been selected from the adjacent region list 500 (step S1510).

Here, when it is determined that there is an unselected region 220 (step S1510: No), the information processing apparatus 100 returns to the process of step S1502. Meanwhile, when it is determined that all of the regions 220 have been selected (step S1510: Yes), the information processing apparatus 100 ends the search processing.

(Response Processing Procedure)

Next, an example of a response processing procedure executed by the information processing apparatus 100 will be described with reference to FIG. 16. The response processing is implemented by, for example, the CPU 301, the storage area such as the memory 302 or the recording medium 305, and the network I/F 303 which are illustrated in FIG. 3.

FIG. 16 is a flowchart illustrating an example of the response processing procedure. In FIG. 16, the information processing apparatus 100 updates the shared resource pool information 700 of the own region 220, based on the shared resource pool information 700 of another region 220 attached to the search request (step S1601).

Next, the information processing apparatus 100 searches the own region 220 for a replacement resource based on the margin resource pool information 600 of the own region 220 (step S1602). Then, the information processing apparatus 100 determines whether or not there is a replacement resource in the own region 220 (step S1603).

Here, when it is determined that there is a replacement resource in the own region 220 (step S1603: Yes), the information processing apparatus 100 proceeds to the process of step S1604. Meanwhile, when it is determined that there is no replacement resource in the own region 220 (step S1603: No), the information processing apparatus 100 proceeds to the process of step S1605.

In step S1604, the information processing apparatus 100 transmits the search result attached with the shared resource pool information 700 of the own region 220 to the apparatus of the request source (step S1604). Then, the information processing apparatus 100 ends the response processing.

In step S1605, the information processing apparatus 100 determines whether to transfer the search request with a probability of 1/n (step S1605).

Here, when it is determined to transfer the search request (step S1605: Yes), the information processing apparatus 100 proceeds to the process of step S1606. Meanwhile, when it is determined not to transfer the search request (step S1605: No), the information processing apparatus 100 proceeds to the process of step S1607.

In step S1606, the information processing apparatus 100 sets an apparatus included in the region 220 that is present at a higher level in the adjacent region list 500, as a transfer destination, and transfers the search request (step S1606). Then, the information processing apparatus 100 ends the response processing.

In step S1607, the information processing apparatus 100 transmits the search result to the apparatus of the requesting source (step S1607). Then, the information processing apparatus 100 ends the response processing.

As described above, the information processing apparatus 100 may perform an operation corresponding to a first apparatus included in a first group, in a system in which a plurality of groups each includes a plurality of resources and an apparatus for managing the plurality of resources and is coupled to each other for a communication.

According to the information processing apparatus 100, it is possible to measure the load of each resource 102 existing in the first group 120. According to the information processing apparatus 100, it is possible to determine whether or not the load of the first resource 102 existing in the first group 120 is equal to or more than the first threshold value, based on the measurement result. According to the information processing apparatus 100, when the load is equal to or more than the first threshold value, it is possible to search the first group 120 for the resource 102 that is the migration destination of the first task performed using the first resource 102. According to the information processing apparatus 100, as the result of the search, when the migration destination resource 102 is not found, it is possible to identify one or more groups including the resource 120 whose load is measured to be less than the second threshold value among the plurality of groups based on the first information 101. According to the information processing apparatus 100, it is possible to select the second group 130 of the one or more groups by referring to the degree of separation between each of the one or more groups and the first group 120. According to the information processing apparatus 100, it is possible to transmit a request to search for the migration destination resource 102 to the second apparatuses 110 included in the selected second group 130. According to the information processing apparatus 100, as the result of transmitting the request, when the second resource 102 that is the migration destination is found in the second group 130, it is possible to update the first information 101 based on the second information 111 transmitted from the second apparatus 110. Accordingly, the information processing apparatus 100 may reduce the traffic amount required for the information collection for updating the first information 101.

According to the information processing apparatus 100, as the result of transmitting the request, when the second resource 102 is found in the second group 130, it is possible to receive the information indicating the second resource 102 transmitted from the second apparatus 110. According to the information processing apparatus 100, it is possible to output an instruction to migrate the first task to the second resource 102 based on the information indicating the second resource 102. Thereby, the information processing apparatus 100 may suppress the efficiency decrease of the first task and the performance degradation of the service formed by the first task.

According to the information processing apparatus 100, it is possible to output an instruction to migrate the second task performed using the second resource 102 to the first resource 102. Thereby, the information processing apparatus 100 may suppress an increase in the load on the second resource 102, thereby suppressing the performance degradation of the service formed by the second task.

According to the information processing apparatus 100, as the result of transmitting the request, when the request is transferred to the third apparatus via the second apparatus 110 and the third resource 102 that is the migration destination is found in the third group, it is possible to receive the third information transmitted from the third apparatus. According to the information processing apparatus 100, it is possible to update the first information 101 based on the received third information. Thereby, the information processing apparatus 100 may reduce the traffic amount required for information collection for updating the first information 101.

According to the information processing apparatus 100, when the third resource 102 that is the migration destination is found in the third group, it is possible to receive the information indicating the third resource 102 transmitted from the third apparatus. According to the information processing apparatus 100, it is possible to output an instruction to migrate the first task to the third resource 102 based on the received information indicating the third resource 102. Thereby, the information processing apparatus 100 may suppress the efficiency decrease of the first task and the performance degradation of the service formed by the first task.

According to the information processing apparatus 100, it is possible to output an instruction to migrate the third task performed using the third resource 102 to the first resource 102. Thereby, the information processing apparatus 100 may suppress an increase in the load on the third resource 102, thereby suppressing the performance degradation of the service formed by the third task.

According to the information processing apparatus 100, as the result of the search, when the resource 102 that is the migration destination is found in the first group 120, it is possible to migrate the first task to the resource 102 that is the migration destination found in the first group 120. Thereby, the information processing apparatus 100 may suppress in the efficiency decrease of the first task and the performance degradation of the service formed by the first task.

According to the information processing apparatus 100, as the result of the search, when the resource 102 that is the migration destination is found in the first group 120, it is possible to migrate a task performed using the resource 102 that is the migration destination found in the first group 120 to the first resource 102. Thereby, the information processing apparatus 100 may suppress an increase in the load on the resource 102 that is the migration destination found in the first group 120. The information processing apparatus 100 may suppress the performance degradation of the service formed by a task performed using the resource 102 that is the migration destination found in the first group 120.

According to the information processing apparatus 100, it is possible to receive a request to search for the resource 102 that is the migration destination of the fourth task performed using the fourth resource 102 existing in the fourth group and having the load equal to or more than the first threshold value, transmitted from the fourth apparatus. According to the information processing apparatus 100, when the request transmitted from the fourth apparatus is received, it is possible to search the first group 120 for the resource 102 that is the migration destination of the fourth task. According to the information processing apparatus 100, as the result of the search, when the resource 102 that is the migration destination of the fourth task is found in the first group 120, the first information 101 may be transmitted to the fourth apparatus. Thereby, the information processing apparatus 100 may reduce the traffic amount required for information collection by the fourth apparatus.

According to the information processing apparatus 100, when the request transmitted from the fourth apparatus is received, it is possible to search the first group 120 for the resource 102 that is the migration destination of the fourth task. According to the information processing apparatus 100, as the result of the search, when the resource 102 that is the migration destination of the fourth task is not found in the first group 120, it is possible to transfer the request to the fifth apparatus based on the first information 101. Thereby, the information processing apparatus 100 may cause the fifth apparatus to search for the resource 102 that is the migration destination of the fourth task, thereby making it easier to find the resource 102 that is the migration destination of the fourth task in the information processing system 200.

According to the information processing apparatus 100, it is possible to determine whether to transfer to the fifth apparatus a request to search for the resource 102 that is the migration destination of the fourth task, based on the number of times the request has been transferred from the fourth apparatus to the own apparatus. Thereby, the information processing apparatus 100 may prevent the request from being transferred in a situation where the probability of the performance degradation of the service formed by the fourth task due to the network latency is relatively high even when the fourth task is migrated since the information processing apparatus 100 is relatively far from the fourth apparatus. Thus, the information processing apparatus 100 may reduce the traffic amount.

According to the information processing apparatus 100, it is possible to select the second group 130 in the order of being closer in the degree of separation to the first group 120 from one or more groups including the resource 102 whose load is measured to be less than the second threshold value among the plurality of groups, based on the first information 101. Thereby, the information processing apparatus 100 may select a group including the resource that is unlikely to cause the degradation in service performance due to the network latency even when the first task is migrated since the group is relatively close to the first group 120.

According to the information processing apparatus 100, it is possible to transmit the first information 101 to the second apparatus 110 when transmitting the request to search for the resource 102 that is the migration destination to the selected second apparatus 110. Thereby, the information processing apparatus 100 may reduce the traffic amount required for information collection by the second apparatus 110.

According to the information processing apparatus 100, it is possible to use the ratio to the size of the resource 102 as the second threshold value. According to the information processing apparatus 100, it is possible to identify one or more groups including the resource 102 whose load is measured to be less than the second threshold value among the plurality of groups, based on the first information 101. According to the information processing apparatus 100, it is possible to select the second group 130 including the resource 102 whose load is less than the second threshold value even when the first task is migrated, among one or more groups by referring to the degree of separation between each of the identified one or more groups and the first group 120. Thereby, the information processing apparatus 100 may select the second group 130 including the resource 102 that is unlikely to cause the efficiency decrease of the first task even when the first task is migrated.

According to the information processing apparatus 100, it is possible to update the first information 101 based on the result of a product set of the correspondence information included in the first information 101 and the correspondence information included in the second information 111. Thereby, the information processing apparatus 100 may delete information determined to be not useful from the viewpoint of searching for the resource 102 that is the migration destination of the first task.

According to the information processing apparatus 100, when the first information 101 does not include the association information that associates a timing within a predetermined period of time from the current timing, it is possible to update the first information 101 in communication with one or more of a plurality of apparatuses included in different groups. Thereby, the information processing apparatus 100 may delete information determined to be not useful from the viewpoint of searching for the resource 102 that is the migration destination of the first task. Further, the information processing apparatus 100 may update the first information 101 by collecting information that is useful from the viewpoint of searching for the resource 102 that is the migration destination of the first task.

According to the information processing apparatus 100, when there is no first information 101, it is possible to generate the first information 101 in communication with one or more of a plurality of apparatuses included in different groups. Thereby, the information processing apparatus 100 may generate the first information 101 by collecting information that is useful from the viewpoint of searching for the resource 102 that is the migration destination of the first task.

According to the information processing apparatus 100, it is possible to measure network latency between the first apparatus and each of a plurality of apparatuses included in different groups. According to the information processing apparatus 100, it is possible to set the degree of separation between the first group 120 and each of the plurality of groups based on the measured network latency. Thereby, the information processing apparatus 100 may select a group relatively close to the first group 120.

According to the information processing apparatus 100, it is possible to use an arithmetic device, a storage device, or a communication band as the resource 102, and hence use the use ratio of the arithmetic device, the use ratio of the storage device, or the data amount input to or output from the communication band, as the load of the resource 102. Thereby, the information processing apparatus 100 may migrate a task according to the load of the arithmetic device, the storage device, or the communication band.

According to the information processing apparatus 100, it is possible to use the average value of the load in a predetermined period. Thereby, the information processing apparatus 100 may prevent a resource 102 that has a small instantaneous load but has a large average load from being selected as the resource 102 that is the migration destination of a task, thereby preventing the efficiency decrease of the task.

The information processing method described in the present embodiment may be implemented by executing a prepared program on a computer such as a personal computer or a work station. The information processing program described in the present embodiment is recorded on a computer-readable recording medium such as a hard disk, a flexible disk, a CD-ROM, an MO, a DVD, or the like and is executed by being read from the recording medium by the computer. Further, the information processing program described in the present embodiment may be distributed via a network such as the Internet.

According to an aspect of the embodiments, it is possible to reduce the traffic amount required to information collection.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a first apparatus to execute a process, the process comprising:

when a load of a first resource existing in a first group is equal to or more than a first threshold value, searching the first group for a first destination resource that is a migration destination of a first task performed using the first resource, the first group being included in a system that includes a plurality of groups communicably coupled to each other, each of the plurality of groups including a plurality of resources and an apparatus for managing the plurality of resources, the first apparatus being included in the first group;

when the first destination resource is found in the first group, migrating the first task to the first destination resource found in the first group;

when the first destination resource is not found in the first group, selecting a second group based on first information that identifies the second group as a group including a resource having a load measured to be less than a second threshold value, and based on a degree of separation of the second group from the first group, the second threshold value being a ratio to a size of a resource, the first information including information that identifies a size of each resource having a load measured to be less than the second threshold value;

selecting, among one or more groups including a resource having a load measured to be less than the second threshold value, the second group that includes a resource having a load less than the second threshold value even when the first task is migrated, by referring to a degree of separation between each of the one or more groups and the first group;

transmitting a first request to search for the first destination resource to a second apparatus included in the second group; and when a second resource that is the first destination resource is found in the second group, updating the first information based on second information that is transmitted from the second apparatus and identifies a group including a resource having a load measured to be less than the second threshold value.

2. The non-transitory computer-readable recording medium according to claim 1, the process further comprising:

when the second resource is found, outputting an instruction to migrate the first task to the second resource based on information that is transmitted from the second apparatus and indicates the second resource.

3. The non-transitory computer-readable recording medium according to claim 2, the process further comprising:

outputting an instruction to migrate a second task performed using the second resource to the first resource based on the information identifying the second resource.

4. The non-transitory computer-readable recording medium according to claim 1, the process further comprising:

when the first request is transferred to a third apparatus included in a third group via the second apparatus and a third resource that is the first destination resource is found in the third group, updating the first information based on third information that is transmitted from the third apparatus and identifies a group including a resource having a load measured to be less than the second threshold value.

5. The non-transitory computer-readable recording medium according to claim 4, the process further comprising:

when the third resource is found, outputting an instruction to migrate the first task to the third resource based on information that is transmitted from the third apparatus and indicates the third resource.

6. The non-transitory computer-readable recording medium according to claim 5, the process further comprising:

outputting an instruction to migrate a third task performed using the third resource to the first resource based on the information identifying the third resource.

7. The non-transitory computer-readable recording medium according to claim 1, the process further comprising:

migrating the task performed using the first destination resource found in the first group to the first resource.

8. The non-transitory computer-readable recording medium according to claim 1, the process further comprising:

when receiving a second request to search for a second destination resource that is a migration destination of another task performed using another resource which exists in another group and whose load is more than the first threshold value, searching the first group for the second destination resource, the second request being originally transmitted from the other apparatus; and when the second destination resource is found in the first group, transmitting the first information to the other apparatus.

9. The non-transitory computer-readable recording medium according to claim 8, the process further comprising:

when the second destination resource is not found in the first group, transferring the second request to yet another apparatus included in yet another group based on the first information.

10. The non-transitory computer-readable recording medium according to claim 9, the process further comprising:

determining whether to transfer the second request based on a number of times that the second request has been transferred from the other apparatus to the first apparatus.

11. The non-transitory computer-readable recording medium according to claim 1, the process further comprising:

when the first destination resource is not found in the first group, selecting the second group having the degree of separation which is a smaller degree of separation from the first group among one or more groups including a resource having a load measured to be less than the second threshold value based on the first information.

12. The non-transitory computer-readable recording medium according to claim 1, the process further comprising:

when transmitting the first request to the second apparatus, transmitting the first information to the second apparatus.

13. The non-transitory computer-readable recording medium according to claim 1, wherein the first information includes first association information that associates each resource having a load measured to be less than the second threshold value with a timing at which the load is measured by the first apparatus, the second information includes second association information that associates each resource having a load measured to be less than the second threshold value with a timing at which the load is measured by the second apparatus, and the process further comprises:

updating the first information based on the result of a product set of the first association information and the second association information.

14. The non-transitory computer-readable recording medium according to claim 1, wherein the first information includes association information that associates each resource having a load measured to be less than the second threshold value with a timing at which the load is measured, and the process further comprises:

when no timing within a predetermined period of time from a current time is associated in the association information, communicating with an apparatus included in each of one or more groups in the system to update the first information.

15. The non-transitory computer-readable recording medium according to claim 1, the process further comprising:

when the first information does not exist, in communicating with an apparatus included in each of one or more groups in the system to generate the first information.

16. The non-transitory computer-readable recording medium according to claim 1, the process further comprising:

measuring a network latency between the first apparatus and an apparatus included in each of groups in the system; and setting the degree of separation between the first group and each of the groups based on the measured network latency.

17. An information processing method, comprising:

when a load of a first resource existing in a first group is equal to or more than a first threshold value, searching by a first apparatus the first group for a first destination resource that is a migration destination of a first task performed using the first resource, the first group being included in a system that includes a plurality of groups communicably coupled to each other, each of the plurality of groups including a plurality of resources and an apparatus for managing the plurality of resources, the first apparatus being included in the first group;

when the first destination resource is found in the first group, migrating the first task to the first destination resource found in the first group;

when the first destination resource is not found in the first group, selecting a second group based on first information that identifies the second group as a group including a resource having a load measured to be less than a second threshold value, and based on a degree of separation of the second group from the first group, the second threshold value being a ratio to a size of a resource, the first information including information that identifies a size of each resource having a load measured to be less than the second threshold value;

selecting, among one or more groups including a resource having a load measured to be less than the second threshold value, the second group that includes a resource having a load less than the second threshold value even when the first task is migrated, by referring to a degree of separation between each of the one or more groups and the first group;

transmitting a first request to search for the first destination resource to a second apparatus included in the second group; and when a second resource that is the first destination resource is found in the second group, updating the first information based on second information that is transmitted from the second apparatus and identifies a group including a resource having a load measured to be less than the second threshold value.

18. An information processing apparatus, comprising:

a memory; and a processor coupled to the memory and the processor configured to:

when a load of a first resource existing in a first group is equal to or more than a first threshold value, search the first group for a first destination resource that is a migration destination of a first task performed using the first resource, the first group being included in a system that includes a plurality of groups communicably coupled to each other, each of the plurality of groups including a plurality of resources and an apparatus for managing the plurality of resources, the information processing apparatus being included in the first group;

when the first destination resource is found in the first group, migrating the first task to the first destination resource found in the first group;

when the first destination resource is not found in the first group, select a second group based on first information that identifies the second group as a group including a resource having a load measured to be less than a second threshold value, and based on a degree of separation of the second group from the first group, the second threshold value being a ratio to a size of a resource, the first information including information that identifies a size of each resource having a load measured to be less than the second threshold value;

selecting, among one or more groups including a resource having a load measured to be less than the second threshold value, the second group that includes a resource having a load less than the second threshold value even when the first task is migrated, by referring to a degree of separation between each of the one or more groups and the first group;

transmit a first request to search for the first destination resource to another apparatus included in the second group; and when a second resource that is the first destination resource is found in the second group, update the first information based on second information that is transmitted from the other apparatus and identifies a group including a resource having a load measured to be less than the second threshold value.

* * * * *